(12) United States Patent
Glover et al.

(10) Patent No.: US 9,311,742 B1
(45) Date of Patent: Apr. 12, 2016

(54) NAVIGATING AN AVATAR THROUGH A VIRTUAL WORLD IN A MOTION CAPTURE SIMULATION ENVIRONMENT

(71) Applicants: Robert Michael Glover, Marietta, GA (US); Arris Eugene Ray, Kennesaw, GA (US); DJ Jonathan Cassel, Acworth, GA (US); Nels Howard Madsen, Auburn, AL (US); Thomas Michael McLaughlin, Miramar Beach, FL (US)

(72) Inventors: Robert Michael Glover, Marietta, GA (US); Arris Eugene Ray, Kennesaw, GA (US); DJ Jonathan Cassel, Acworth, GA (US); Nels Howard Madsen, Auburn, AL (US); Thomas Michael McLaughlin, Miramar Beach, FL (US)

(73) Assignee: Motion Reality, Inc., Marietta, GA (US)

( * ) Notice: Subject to any disclaimer, the term of this patent is extended or adjusted under 35 U.S.C. 154(b) by 363 days.

(21) Appl. No.: 14/136,845

(22) Filed: Dec. 20, 2013

Related U.S. Application Data

(63) Continuation-in-part of application No. 13/551,173, filed on Jul. 17, 2012, now Pat. No. 9,159,152.

(60) Provisional application No. 61/508,858, filed on Jul. 18, 2011, provisional application No. 61/745,330, filed on Dec. 21, 2012.

(51) Int. Cl.
| | |
|---|---|
| *A63F 9/14* | (2006.01) |
| *G06T 15/08* | (2011.01) |
| *G06T 13/40* | (2011.01) |
| *G06T 13/00* | (2011.01) |
| *A63F 13/40* | (2014.01) |

(52) U.S. Cl.
CPC ............... *G06T 15/08* (2013.01); *A63F 13/10* (2013.01); *G06T 13/00* (2013.01); *G06T 13/40* (2013.01); *A63F 2300/66* (2013.01)

(58) Field of Classification Search
CPC .......... G06T 13/40; G06T 13/00; A63F 13/10; A63F 2300/66; A63F 13/12
See application file for complete search history.

(56) References Cited

U.S. PATENT DOCUMENTS

| | | | |
|---|---|---|---|
| 6,361,438 B1 * | 3/2002 | Morihira | A63F 13/10 345/473 |
| 2012/0244945 A1 * | 9/2012 | Kolo | A63F 13/12 463/42 |
| 2013/0065692 A1 * | 3/2013 | Aronzon | A63F 13/06 463/42 |

OTHER PUBLICATIONS

Zhang, "Flexible and general redirected walking for head-mounted displays", Virtual Reality (VR), 2013 IEEE, Mar. 18-20, 2013.*

* cited by examiner

*Primary Examiner* — James A Thompson
*Assistant Examiner* — Tapas Mazumder
(74) *Attorney, Agent, or Firm* — King & Spalding

(57) ABSTRACT

A computer determines a modified location for an avatar of a first entity in a virtual environment based on a location of the first entity in a capture volume and a transformation used to map a second entity from the capture volume to the virtual environment. The modified location of the avatar of the first entity relative to a location of an avatar of the second entity is consistent with the location of the first entity relative to the location of the second entity in the capture volume. Once the modified location is determined, the computer displays a graphical cue corresponding to the first entity at the modified location of the avatar of the first entity provided that a distance between the modified location of the avatar of the first entity is different from a current location of the avatar of the first entity in the virtual environment.

20 Claims, 15 Drawing Sheets

NAVIGATING AN AVATAR THROUGH A VIRTUAL WORLD IN A MOTION CAPTURE SIMULATION ENVIRONMENT

CROSS REFERENCE TO RELATED APPLICATIONS

This application is a continuation-in-part application of U.S. patent application Ser. No. 13/551,173 filed Jul. 17, 2012 in the name of Robert Michael Glover, Nels Howard Madsen, and Thomas Michael McLaughlin and entitled "Mapping between a Capture Volume and a Virtual World in a Motion Capture Simulation Environment," which claims priority to U.S. Provisional Patent Application No. 61/508,858 filed Jul. 18, 2011 in the name of Robert Michael Glover, Nels Howard Madsen, and Thomas Michael McLaughlin and entitled "Mapping between the Motion Capture Volume and the Virtual World," the entire contents of both applications being incorporated herein by reference.

Further, this application claims priority to U.S. Provisional Patent Application No. 61/745,330 filed Dec. 21, 2012 in the name of Robert Michael Glover, Nels Howard Madsen, Thomas Michael McLaughlin, Arris Eugene Ray, D J Jonathan Cassel, Timothy Lee Petty, Ryan Matthew Kirby, and Robert Kyle Turner and entitled "Navigating Freely and Autonomously to Any Location in a Virtual World of Any Size," the entire content of which are hereby incorporated herein by reference.

FIELD OF INVENTION

This disclosure relates generally to a technical field of simulation systems and, in one example embodiment, to a system, method and an apparatus for navigating and avatar through a virtual world in a motion capture simulation environment.

BACKGROUND

Training in realistic situations often yields substantial performance improvement. However, such realistic training can pose a high risk to participants, especially if the training involves potentially dangerous tasks or operations in hostile and/or potentially threatening environments. So, to provide participants with reduced risk environments for training, the realistic situations can be simulated using motion capture, where the term 'motion capture' refers generally to capturing any appropriate motion of an object (animate or inanimate) in the real-world using appropriate sensors and translating the motion from the real-world to a motion of a computer-generated model (herein interchangeably referred to as 'avatar') of the object in a virtual environment.

In a motion capture simulation, the real-world environment may include a capture volume and participants disposed within the capture volume may be mapped to a virtual environment where each participant may be represented by their respective avatar. Further, the motion of the avatar in the virtual environment may be driven by a motion of the entity in the capture volume. Typically, the capture volume may be dimensionally constrained while their counterpart virtual environment may provide an unrestrained space for movement. For example, the capture volume may be the size of a basketball court, while the corresponding virtual environment to which an entity in the capture volume is mapped may be the size of a large town. The dimensional constraints of the capture volume may hinder a seamless navigation in the virtual environment. For example, the movement of a participant in the real world may be limited within the boundaries of a room while the corresponding virtual environment is much larger than the room.

To address limitations of movement arising from the dimensional constraints of the capture volume, when a participant reaches a dimensional constraint (e.g., boundary) of the capture volume, a system may redirect a participant from a previous direction to a different direction of movement in the capture volume while allowing the avatar of the participant to continue along the previous direction in the virtual environment. In other words, even though a participant's direction in the capture volume is changed, the avatar's direction in the virtual environment remains the same. This redirection of the participant's direction of movement in the capture volume and change in correlation between the movement of the participant and participant's respective avatar may be harmless when there is only one participant in the capture volume. However, when there are multiple participants, a redirection of one or more participants may cause the participants to collide with each other because the relative positions of the participants in the capture volume with respect to each other differ from the relative positions of their respective avatars with respect to each other's avatars in the virtual environment. Further, a difference in the relative positions of participants in the capture volume and the virtual environment may limit the ability of the participants to perform group activities in the virtual environment that may require the participants to be aligned in specific formations in the capture volume, for example, clearing a room which requires physical contact in a tight stacked formation in the capture volume, and carrying of one subject by another, e.g. a wounded soldier. In view of the foregoing discussion of representative shortcomings, need for improved mapping and navigation through the virtual environment that addresses the above-mentioned shortcomings is apparent.

SUMMARY

The present invention can address the needs described above by providing methods for avoiding collisions between entities in the capture volume while they drive their respective avatars to navigate through the virtual environment. The present invention can be implemented as a safety feature in any appropriate motion capture environment where the entities in the physical (real) world are immersed in the virtual world.

In one example aspect of the present invention, a method can include receiving motion capture data of a first entity and a second entity disposed in a capture volume. Using the motion capture data, a location of the first entity and the second entity in the capture volume and a location of their respective avatars in the virtual environment is determined. Further, the method can include determining if the location of the first entity relative to the location of second entity in the capture volume substantially matches the location of the first entity's avatar relative to the location of the second entity's avatar. One of ordinary skill in the art can understand and appreciate that, in addition to location of the entities, any other appropriate aspect of the entities, such as orientation, direction of movement, etc., can also be determined and compared without departing from a broader scope of this disclosure.

If their respective locations, between the capture volume and the virtual world do not match, the method includes computing a modified location of the first entity's avatar using the transformation used to map the second entity from the capture volume to the virtual environment. In one example, the method can also include a step of computing a modified location of the second entity's avatar based on transformations used to map the first entity to the virtual environment. Once the modified location of the first entity's avatar is determined, the method includes displaying a graphical cue corresponding to the first entity at the modified location in the virtual environment if a distance of separation between a current location of the first entity's avatar and the modified location of the first entity's avatar is greater than a threshold distance. Since the modified location of the first entity's avatar is computed using transformations that map the second entity to the virtual environment, the modified location where the graphical cue is placed relative to the location of the second entity's avatar is substantially identical to the location of the first entity relative to the location of the second entity in the capture volume. Accordingly, the second entity can avoid a collision with the first entity in the capture volume by avoiding the graphical cue corresponding to the first entity in the virtual environment.

In another aspect, a method can include computing a modified location of a first entity's avatar in the virtual environment based on a location of the first entity in the capture volume and transformations that are used to map the second entity from the capture volume to the virtual environment. Then, the method includes comparing a current location of the first entity's avatar and the modified location of the first entity's avatar. If the modified location and current location of the first entity's avatar are different, then, the method includes computing and rendering a graphical cue corresponding to the first entity at the modified location in a virtual environment. On the contrary, if the modified location and current location of the first entity's avatar are substantially the same, then the graphical cue is made invisible in the virtual environment displayed to the second entity.

The foregoing discussion of avoiding collisions in a real world while navigating through a virtual world is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

BRIEF DESCRIPTION OF THE DRAWINGS

Example embodiments are illustrated by way of example and not limitation in the figures of accompanying drawings, in which.

Figure 1:
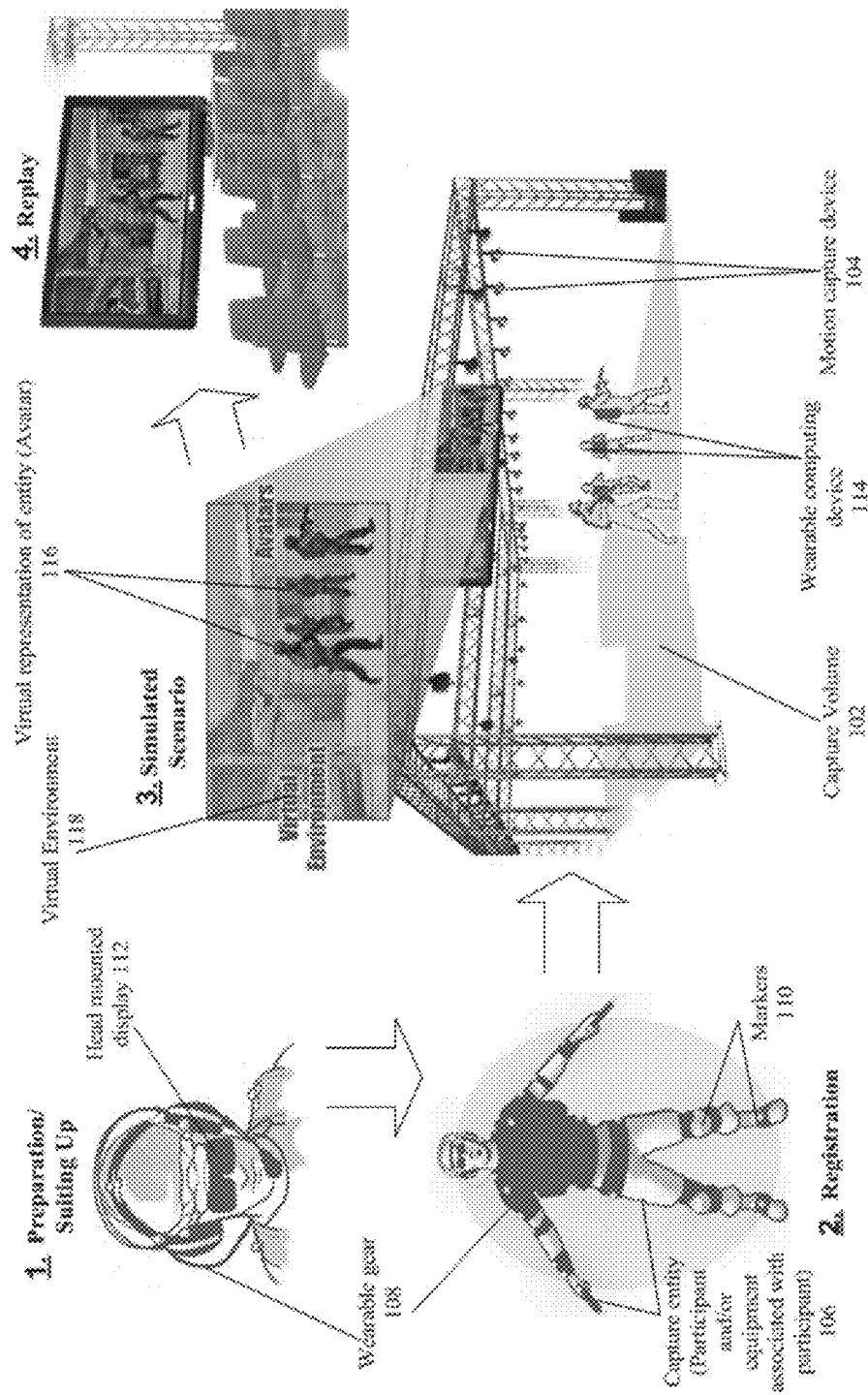
FIG. 1 illustrates an exemplary operational environment for sensory immersive motion capture simulation, according to certain exemplary embodiments of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from accompanying text, including the Detailed Description that follows.

DETAILED DESCRIPTION

Disclosed are a system, a method and an apparatus for regrouping in a motion capture simulation environment. Before discussing the embodiments directed to the method and system for navigating through a virtual environment having real-world elevation characteristics, it may assist the reader to understand the various terms used herein by way of a general description of the terms in the following paragraphs.

The term 'capture volume' as used herein generally refers to a physical volume of space that may or may not be confined by a boundary. Further, the capture volume may be under surveillance of one or more devices that can capture appropriate motion of an entity in the capture volume. In one example, a capture volume may be contiguous or in multiple parts that are remote from one another and linked through networking technology.

The term 'virtual environment' as used herein generally refers to an environment generated, produced, created, or rendered by one or more computer systems for computer based simulations. In some embodiments, the virtual environment and the capture volume can be mapped one to one. In other embodiments, the virtual environment may be intended to include a region much larger than the capture volume. For example, the capture volume may be a 100×50 feet space, whereas the virtual environment that is a scaled mapping of the capture volume may be the size of a large city. The virtual environment may be designed such that a user within the confines of the capture volume can feel a sense of immersion in the much larger virtual environment. A listing of other examples of virtual environments without being exhaustive can include desert environments, rain forest environments, urban environments, war zones, hospitals, fire stations, multistory buildings, an aerial views of a world, or any other conceivable and designable environment in which a participant can be immersed through motion capture. The term 'entity' as used herein generally refers to any appropriate animate or inanimate object. For example, the entity may be a participant person, an animal, and so on. In another example, the entity may be a weapon, a vehicle or so on. In a further example, the participant can wield or operate a weapon or other inanimate objects, both of which may be motion captured using appropriate motion capture devices.

The term 'avatar' as used herein generally refers to virtual representation of the entity in the virtual environment that is computer generated and whose actions are driven by the behavior and/or actions of the entity in the capture volume. The avatar can have a living human counterpart that is active during the simulation. In some embodiments, the term 'avatar' can refer to a representation of an inanimate object in the virtual environment that is computer generated and driven by said inanimate object in the capture volume. For example, a vehicle or a weapon in the capture volume may have a corresponding avatar in the virtual environment by way of motion capture of the vehicle or weapon in the capture volume.

The term 'applying a transformation,' as used herein generally refers to applying a matrix transformation or using transformation matrices for any appropriate operation. In this following description the transformation matrices are applied to a motion data of an entity in the real-world (e.g., capture volume) for mapping the entity (hereinafter referred to as 'participant', unless specified otherwise) from the real-world to a virtual world. In one example embodiment, initially a participants real-world position and orientation can be defined with respect to a Cartesian coordinate system that is associated with the capture volume in the real-world. In response to determining the position and orientation of the participant, the participant's local frame can be transformed to the motion-capture Cartesian coordinate frame using a first transformation matrix (e.g., 4×4 transformation matrix). Once the participant's local frame is transformed to the Cartesian coordinate frame, a second transformation matrix (e.g., 4×4 transformation matrix) can be applied to map the participant from the Cartesian coordinate system into a virtual world coordinate system. In an example embodiment, the second transformation matrix can contain any appropriate arbitrary translation and rotation about any or all of the 3 axes, depending on a desired operational position and orientation of the participant's avatar in the virtual world. Accordingly, the participant's position and orientation in the virtual world may be defined by manipulating the first and second transformation matrices. In other words, the participant's avatar can be moved throughout the virtual world based on the movement of the participant in the real-world (e.g., capture volume) (which in turn modifies the first transformation matrix) and by also manipulating the second transformation matrix.

The term 'graphical cue,' as used herein may refer to any appropriate representation in the virtual world that corresponds to an entity in the capture volume and is distinguishable from an avatar of the entity in the virtual world. For example, the graphical cue may be a ring, a halo, a transparent skeletal frame of the entity, a ghost image, etc.

To further assist the reader in understanding the method, system, and apparatus for navigating in a virtual environment having real-world elevation characteristics using motion capture, a brief description of a motion capture system is provided in the following paragraphs.

A motion capture simulation system enables participants in a capture volume to be immersed in a three-dimensional virtual reality environment (interchangeably referred to as "virtual world") where each participant is represented by their respective virtual representation (hereinafter "avatars"). The motion of the participants in the capture volume can be captured using one or more motion capture devices, such as imaging sensors, motion capture cameras, and so on. The motion data (herein 'motion capture data') corresponding to the motion of the participants that is captured using the one or more motion capture devices can be used to drive the participants' respective avatars in the virtual world. In other words, the motion capture data can be used to characterize with high fidelity the movements and actions of the participants, which are immediately and accurately, translated into corresponding movements and actions of the participants' avatars in the virtual world. The participants immersed in the virtual environment can interact with each other, virtual props in the environment and virtual characters via their respective avatars. In addition, the participants can take part in various activities in the virtual environment such as group training, combat training, team building, or any other appropriate individual or team activities.

In addition to avatars of the participants, the virtual world may include virtual characters or objects that are computer generated and controlled using artificial intelligence algorithms to interact with other virtual characters, avatars, or objects. In one example, the virtual characters may not have human counterparts that drive the virtual characters, rather, the virtual characters may be driven independent of human counterparts and by artificial intelligence algorithms as discussed above. In other words, a virtual character is one that does not have a living human counterpart that is active in the simulation during the simulation. Hereinafter, the term virtual character may be interchangeably referred to as an AI character without departing from a broader scope of this description.

The motion capture simulation system can provide a sensory immersive experience to the participant by providing various sensory feedback signals to the participants. The sensory feedback signal provided to the participants can be adapted to the perspective, orientation and configuration of the respective participant's avatar. The various sensory feedback signals can include visual, audio, tactile and olfactory feedback and they can be generated based on the motion capture data and other physiological data from the participants in the motion capture simulation system. In particular, the motion capture data of a participant can be used to model, inter alia, a visual field of view and a surround sound audio effect as perceived by the participant's avatar in the virtual environment. The modeled field of view and the surround sound audio effect may be transferred to the participant in the motion capture simulation system as visual and audio feedback respectively, to provide the participant with a sensory immersion experience into the virtual environment.

The participants can receive the various sensory feedback signals using a wearable computing device donned by each of the participants. The wearable computing device can be adapted to receive the feedback signals, process it when needed and transfer the feedback signal to the participant through adapted feedback communication devices.

In one embodiment, the feedback communication devices can be attached to the participant. For example, a muscle stimulation sensor may be attached to the participant to receive a tactile feedback signal. In another embodiment, the feedback communication devices can be disposed in the capture volume having the participants. For example, surround sound speakers may be disposed in the capture volume. In one example embodiment, the visual feedback can be provided as a first person stereoscopic point of view (POV) display to a participant using a head mounted display device (HMD). In another example embodiment, the audio feedback can be provided as a surround sound effect customized to the perspective of the participant's avatar through a pair of headphones.

Now proceeding to describe the method, apparatus, and system for navigating an avatar through a virtual world in a motion capture simulation environment, the following paragraphs provide an introduction to an exemplary system for navigation in the virtual world having real-world elevation characteristics.

An exemplary system for navigating an avatar through a virtual world in a motion capture simulation environment includes a capture volume in which a plurality of participants including a first and a second participant are disposed. A motion of the first and the second participant in the capture volume is captured using one or more motion capture devices included in the capture volume and is translated by a simulation engine into a movement of their respective avatar's in a virtual world. In some embodiments, the capture volume may be enclosed by boundaries such as, inter alia, walls or other similar structures, while the virtual environment may extend over a nearly infinite volume. Consequently, the first and the second participant may reach the boundary of the capture volume as they move in the capture volume. When each of the first and second participant reaches a boundary of the capture volume, a correlation between the movement of the first and second participant in the capture volume and the movement of the first participant's avatar and the second participant's avatar in the virtual environment can be changed. In particular, the first and the second participants may be redirected to move along a different direction that is away from the approaching boundary while their respective avatars are allowed to continue along a previous direction. For example, a participant in a capture volume bound by walls moves from north to south and the participant's avatar moves from north to south in the virtual environment. In said example, when the participant is approaching a wall in the capture volume, the participant may be redirected to change direction of movement and start moving from south to north away from the approaching wall while the participant's avatar continues to move from north to south in the virtual environment. The process of redirection of the participants upon or prior to reaching an approaching boundary is described in greater detail in U.S. patent application Ser. No. 13/551,173 and U.S. Provisional Patent Application No. 61/508,858, the entire content of which are incorporated herein by reference.

The direction to which the first participant is redirected and the direction to which the second participant is redirected may be either be similar or different as chosen by a simulation engine. In either case, after being redirected, the relative positions and direction of movement of first and the second participant may be different from their initial relative position and direction of movement in the capture volume, while the relative positions and directions of movement of their respective avatars may continue maintaining their initial relative positions and directions in the virtual environment. For example, before redirection, the first participant may be located on the right side of the second participant and a similar relation is maintained between their avatars in the virtual environment. Further, the first and the second participant and their respective avatars may be moving from north to south. However, in said example, after redirection, the second participant may be moving from south to north and the first participant may be moving from north to south and the first participant may be located on the left side of the second participant in the capture volume, while their respective avatars may continue moving from north to south with the first participant's avatar being located on the right side of the second participant's avatar.

In one example embodiment, the above mentioned redirection of the participants may result in a collision between the participants in the capture volume, especially since the participants are donning a head mounted display that immerses them into the virtual world and they may not have direct vision of the other participants or props in the capture volume. For example, two participants may be 5 feet away from each other and heading towards each other in the capture volume consequent to the redirection while their respective avatars may be 100 feet away heading away from each other. In said example, since the participants, while disposed in the capture volume, are immersed in the virtual environment using their head mounted displays (and/or other devices), the participants may operate in the capture volume as if they are 100 feet apart and heading away from each other while in reality they are 5 feet apart and heading towards each other in the capture volume. Further, since they are donning a head mounted display, they may not have a direct view (may have partial view through peripheral vision via peripheral spaces of head mounted display) of the other participants and/or objects in the capture volume and eventually collide with said other participants and/or objects in the capture volume that do not have a mapping in the virtual world that is consistent with their relative positions to the participant in the capture volume.

To prevent a collision between participants in the capture volume, a simulation engine determines that a location of a first entity (participant or object) relative to the location of the second entity (participant or object) in the capture volume is different from a location of the first entity's avatar relative to the second entity's avatar in the virtual environment. Further, in response to determining that the relative locations of the entities in the capture volume and the relative locations of their respective avatars in the virtual environment are different, the simulation engine computes a modified location for the first entity's avatar in the virtual environment based on the location of the first entity in the capture volume and a transformation used to map the second entity from the capture volume to the virtual environment. Then, a graphical cue corresponding to the first entity is rendered and placed at the modified location of the first entity's avatar in the virtual environment that is displayed to the second participant if a vertical or horizontal distance between the location of the first entity's avatar and the modified location of the first entity's avatar is greater than a threshold distance. The modified location is computed such that the modified location of the first entity's avatar relative to the location of the second entity's avatar in the virtual environment substantially matches the location of the first entity relative to the second entity in the capture volume. In other words, a graphical cue corresponding to the first participant in the virtual environment gives the second participant in the capture volume an estimate of the first participants location in the capture volume with respect to the second participant while the second participant is still immersed in the virtual environment via the head mounted display.

Alternatively, instead of an initial determination that a location of a first entity (participant or object) relative to the location of the second entity (participant or object) in the capture volume is different from a location of the first entity's avatar relative to the second entity's avatar in the virtual environment, the simulation engine can start by directly computing a modified location of a first participant's avatar based on a mapping of the second participant from the capture volume to the virtual environment. Then, if the modified location of the first entity's avatar is different from a current location of the first entity's avatar, the simulation engine displays a graphical cue corresponding to the first entity at the modified location.

For example, in one scenario, the first participant's avatar and the second participant's avatars are 100 feet apart and heading away from each other in the virtual world while the first participant is 5 feet apart in front of the second participant and heading towards each other in the capture volume. In said example scenario, the simulation engine may generate a graphical cue corresponding to the first participant in the virtual world that is displayed to the second participant at a location that is 5 feet in front of the second participant's avatar in the virtual world. The location of the graphical cue corresponds to the location of the first participant relative to the second participant in the capture volume. That is, the graphical cue corresponding to the first participant placed in the virtual environment displayed to the second participant may indicate to the second participant that the first participant is 5 feet in front of him in the capture volume, even though the first participant's avatar is 100 feet apart and heading away from the second participant's avatar in the virtual world. The second participant can then avoid collision with the first participant in the capture volume by avoiding a collision with the graphical cue in the virtual environment. In said example, the virtual environment displayed to the second participant may include both the graphical cue, which is 5 feet in front of the second participant's avatar, and the first participant's avatar that is 100 feet away from the second participant's avatar. In addition, in said example, the simulation engine may generate another graphical cue corresponding to the second participant and place it at a location that is 5 feet in front of the first participant's avatar in the virtual environment that is displayed to the first participant. The second graphical cue indicates to the first participant that the second participant is 5 feet in front of the first participant in the capture volume.

It must be noted that the virtual environments displayed to each participant may be unique to the participant based on their respective transformation parameters that are used to map each participant from the capture volume to the virtual world. It must be noted that, even though the modified location is associated with the first entity's avatar, the first entity's avatar is not placed at the modified location, rather a graphical cue corresponding to the first entity is placed at the modified location while the first entity's avatar maintains its original location in the virtual environment. Further, it must be noted that even though the dimensions of the graphical cue matches a general dimension of a participant, the graphical cue is rendered such that other participants can recognize that the graphical cue is an indicator to avoid collision and not an avatar of a participant. In addition, it must be noted that one or more of the entities may be an inanimate object, like a raised platform, pillar in the middle of the room, or so on. For example, a capture volume may include a pillar and accordingly a graphical cue of a pillar may be provided in the virtual environment displayed to each participant such that the participants can avoid colliding with the pillar by avoiding the graphical cue of the pillar displayed in the virtual world.

In another example embodiment, the above mentioned redirection of the participants upon approaching a boundary of the capture volume may disrupt the relative positions of the participants in the capture volume from an initial relative positions of the participants in the capture volume and/or the relative positions of the corresponding avatars in the virtual environment. The participants can continue operating from their disrupted positions until a scenario, such as clearing a room arises, which requires the relative positions of participants in a capture volume to tightly match the corresponding relative positions of the participants' respective avatars in the virtual environment. When such a scenario arises where the relative positions of participants in a capture volume have to tightly match the corresponding relative positions of the participants' respective avatars in the virtual environment, the participants have to regroup in the capture volume while still immersed in the virtual environment through their head mounted displays (and/or other devices).

Regrouping of the participants in the capture volume may be initiated when the simulation engine receives a regroup signal that indicates a desire to substantially match the relative positions of the participants in the capture volume with the relative positions of their respective avatars in the virtual environment. The regroup signal may be received from one of the participants in the capture volume or an operator of the simulation engine. In an example embodiment that includes a first entity and a second entity in the capture volume, upon receiving the regroup signal, the simulation engine computes a new location for each of the first entity's avatar and the second entity's avatar in the virtual environment. Further, the simulation engine relocates at least one or both of the first entity's avatar and second entity's avatar to their respective new locations in the virtual environment. The new locations may be computed such that the new location of the first entity's avatar relative to the location of the second entity's avatar, the location of the first entity's avatar relative to the new location of the second entity's avatar, and/or the new location of the first entity's avatar relative to the new location of the second entity's avatar in the virtual environment substantially matches the location of the first entity relative to the location of the second entity in the capture volume. Once the new locations are computed and the entity's avatar are relocated to the new location, the first and second entity can regroup into their desired formation in the capture volume. In one example, the simulation engine provides a timer in the virtual environment displayed to each participant. The timer indicates a time interval within which the participants are supposed to regroup. In another example, in addition to the timer, the simulation engine can provide directional cues to each participant in the virtual environment displayed to each participant. In said example, after being relocated, if the participants' avatars are to assemble at a target location in the virtual environment for an exercise, directional cues that indicate a direction towards the target location may be provided.

In one embodiment, the first participant's avatar and the second participant's avatar may be relocated to a virtual room that is common to both the avatars and that is outside the current simulation scenario by applying similar transformation parameters to the motion data of both the first and the second participant. In another embodiment, the one participant's avatar may be relocated based on a transformation that is used to map another participant from the capture volume to the virtual environment. For example, the first participant's avatar is be relocated by using transformation parameters that are used to map the second participant from the capture volume to the virtual environment. In the former embodiment, both the first participant's avatar and the second participant's avatar are relocated, whereas in the latter embodiment, the second participant's avatar maintains its location while the first participant's avatar is relocated in relation the second participant's avatar.

For example, in one scenario, the first participant's avatar and the second participant's avatar may be in standing 5 feet apart and next to each other in front of a house in the virtual environment, but in the real-world, the first participant and the second participant may be standing 20 feet apart at opposite corners of the capture volume. Further, in said example scenario, the participants' avatars may have to perform a tactical operation such as clearing the house which may require the relative locations of the participants in the capture volume to match the relative location of the participants' avatars in the virtual environment. Accordingly, in one example embodiment, the participant's avatars may be relocated to a new location in a virtual room in the virtual environment that is outside the simulation scenario, and their new locations in the virtual room corresponds to their relative locations in the capture volume. That is, the simulation may stop and the participants' avatars may be transported or the avatars may re-spawn in a virtual room in the virtual environment at their new locations that are 20 feet apart and opposite to each other as they located in the capture volume. Further, the participants in the capture volume may be directed to regroup, while still donning their head mounted displays and while still immersed in the virtual world, by displaying directional cues and timers in the virtual environment rendered to each of the participants. That is, the participants are directed to walk from their respective corners to a location where they will be standing next to each other. Then, the simulation engine transports them from the virtual room back to the simulation scenario in front of the house. Now, the location of a first entity's avatar relative to a location of the second entity's in a virtual environment is different from a location of a first entity relative to a location of a second entity in a capture volume.

Alternatively, in said example, one of the first participant's avatar and the second participant's avatar maintains its location in front of the house in the virtual environment while the other participant's avatar re-spawns at a new location which may be away from the house at a location in the virtual environment that is identical to their location in the capture volume. After transporting the avatar to the new location, directions may be provided in the virtual environment to direct the participant whose avatar has been relocated. The directions may lead the participant to be located next to the participant in the capture volume whose avatar maintained its original location. Correspondingly, the first participant's avatar and the second participant's avatar will be next to each other in front of the house in the virtual environment. In some embodiments, directional aid may not be provided.

In another example, participant A and participant B may be standing next to each other in the capture volume while participant A's avatar may be in front of a house in the virtual environment and participant B's avatar may be 100 feet away from participant A's avatar in another location in the virtual environment. In said example, participant A sends a regroup signal to the simulation engine and participant B's avatar gets transported next to participant A's avatar which is identical to how they are located in the capture volume.

Once the relative locations of the participants in the capture volume match their relative locations in the virtual environment after regrouping, the simulation scenario may start and the participant's avatar may be allowed to perform any activity as desired.

In one example embodiment, when the participant in the capture volume is redirected from a first direction to a second direction upon approaching a boundary of the capture volume, the simulation engine may determine if the participant may reach another boundary along the second direction within a threshold time interval. For example, if a participant is in corner of a room, and the participant is redirected to change his direction by 180 degrees, the participant may approach another boundary within a short interval of time, and may get redirected again by 180 degrees and he may get stuck being repeatedly redirected between the walls in the corner of the room. Accordingly, if the simulation engine determines that the participant approaches another boundary along a second direction in a short interval of time, the simulation engine may redirect the participant to a third direction which gives the participant more unobstructed mobility, for example center of the room.

It must be noted that even though the above-mentioned examples describe the relative distance between the participant's avatars along an x-axis (or lateral plane), in some embodiments, the distance between the participant's avatars in the virtual world may be along a y-axis (or elevation axis). For example, the first participant's avatar may be on a first floor of a building in the virtual environment while the second participant's avatar may be on a second floor of the building in the virtual environment. In yet another embodiment, the participant's avatar may be located in virtual environments that are different from each other even though the participants are in the same capture volume in the real-world.

Figure 10:
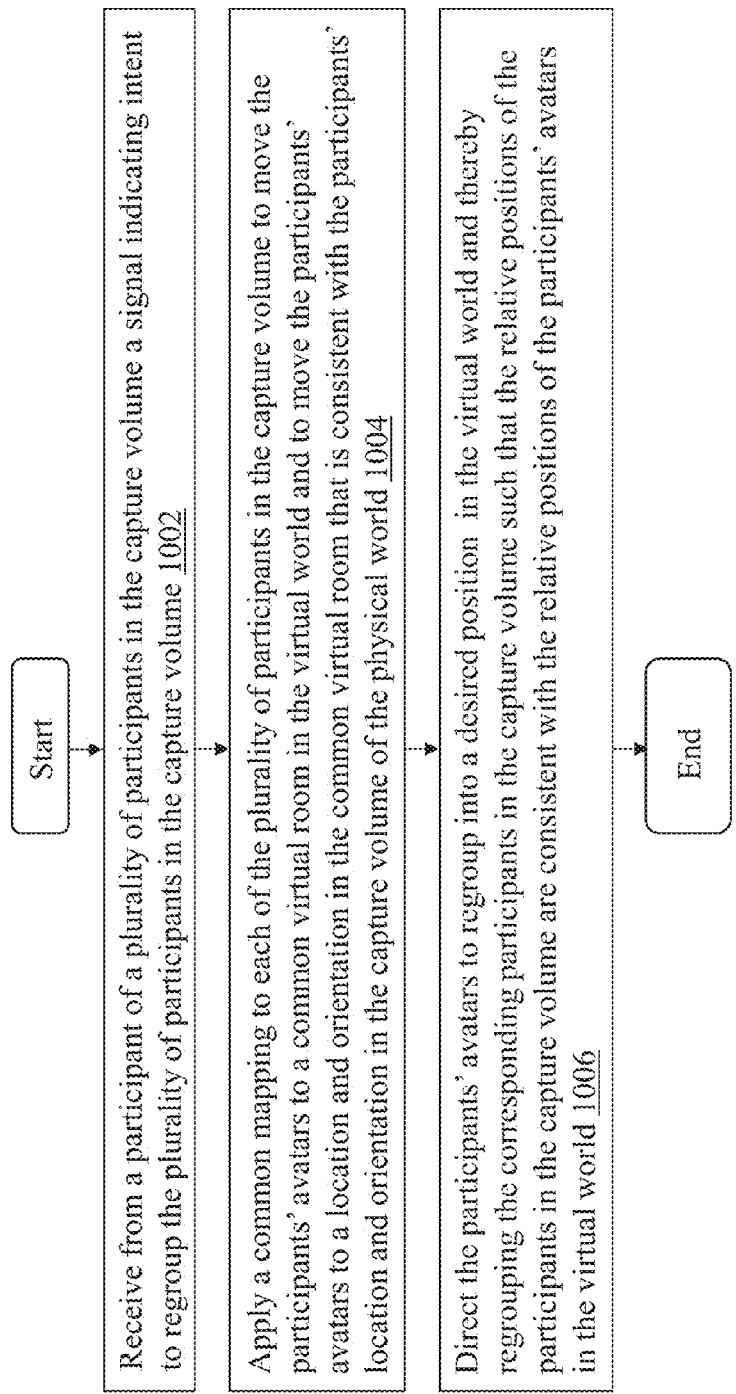
FIG. 10 is a flowchart that illustrates a process of regrouping physical entities in a capture volume using a common virtual room, according to certain exemplary embodiments of the present invention
Figure 11:
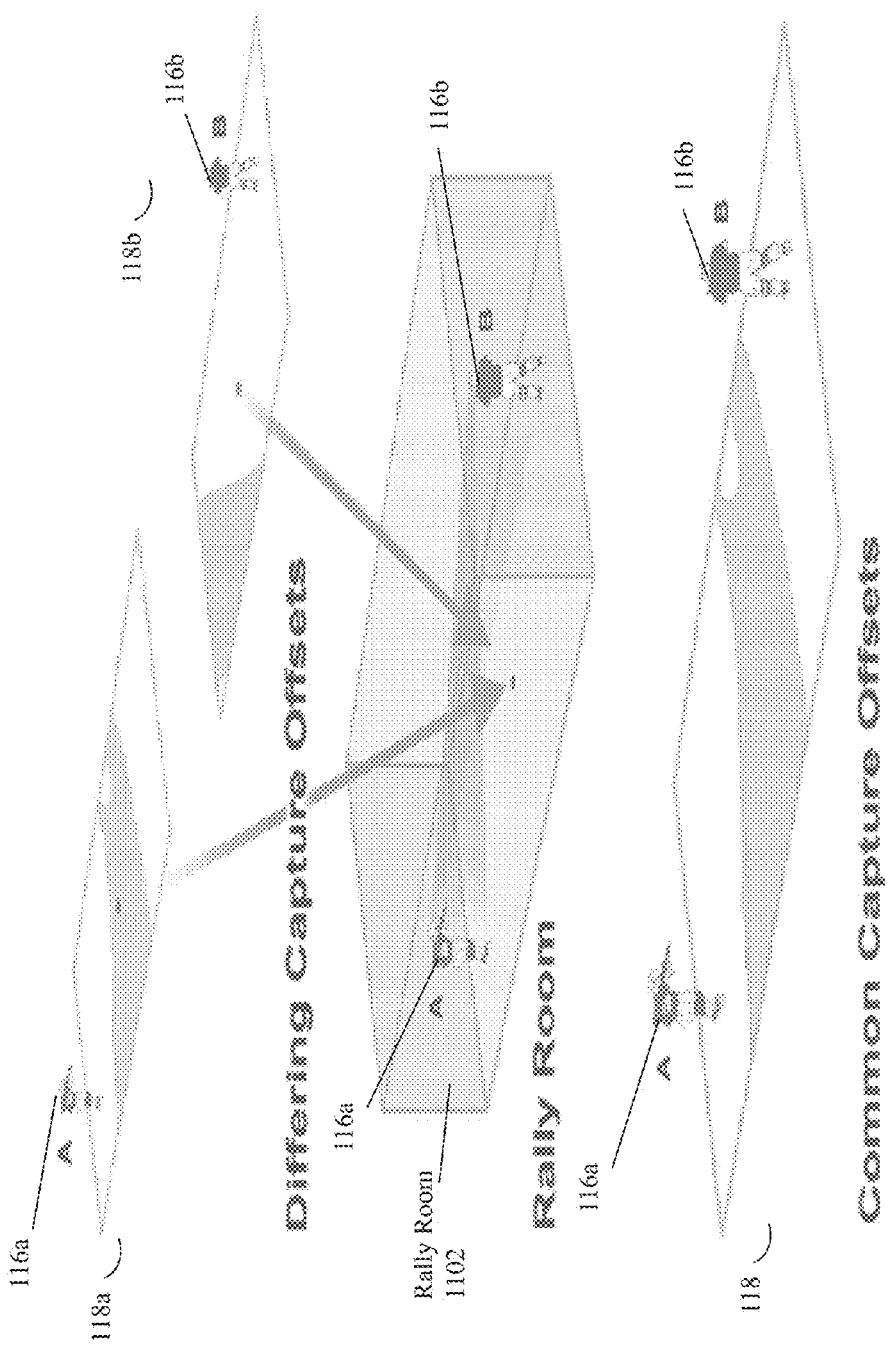
FIG. 11 illustrates a graphical representation associated with the process of regrouping physical entities in a capture volume using a common virtual room, according to certain exemplary embodiments of the present invention.
Figure 12A:
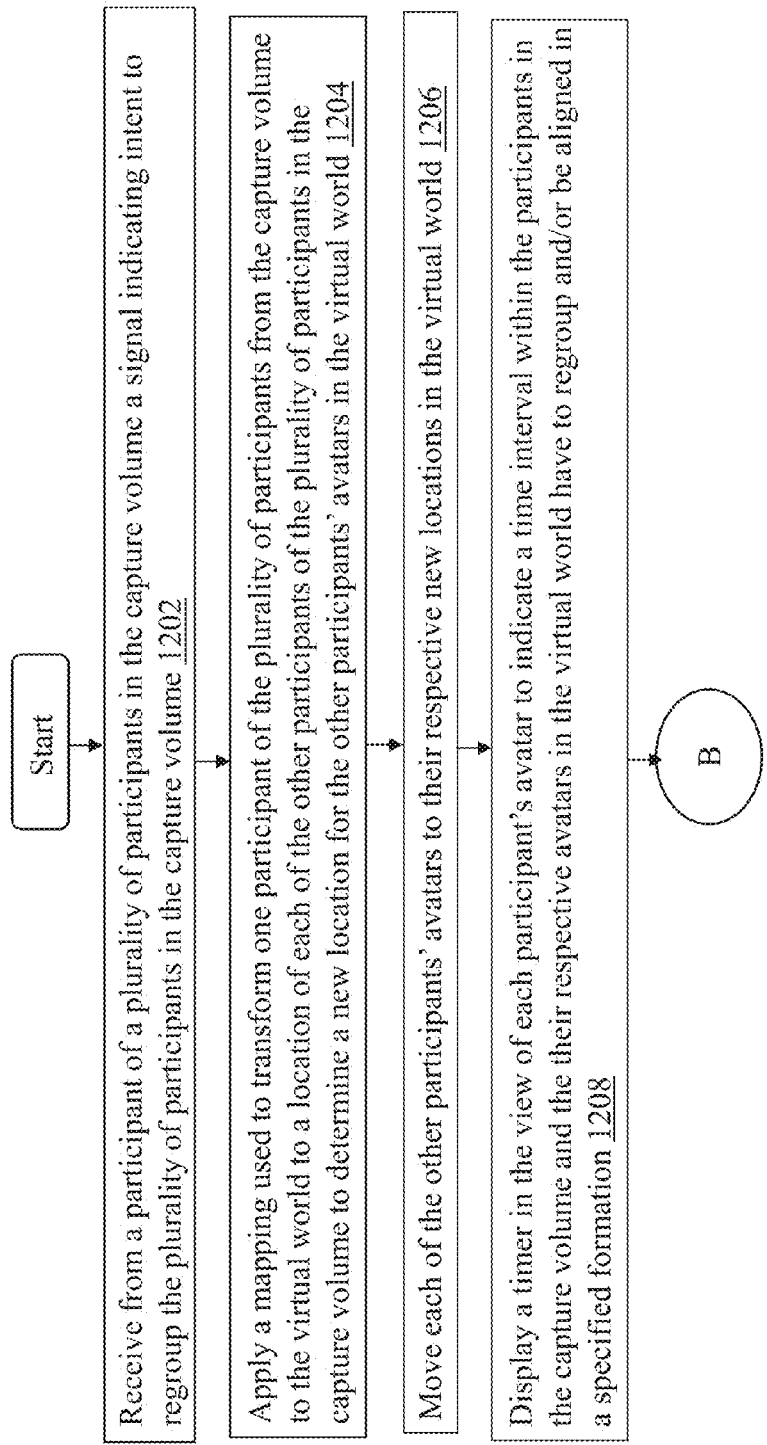
FIGS. 12A and 12B (collectively 'FIG. 12') are flowcharts that illustrate a process of regrouping physical entities in a capture volume by synchronizing the mapping of the physical entities, according to certain exemplary embodiments of the present invention.
Figure 12B:
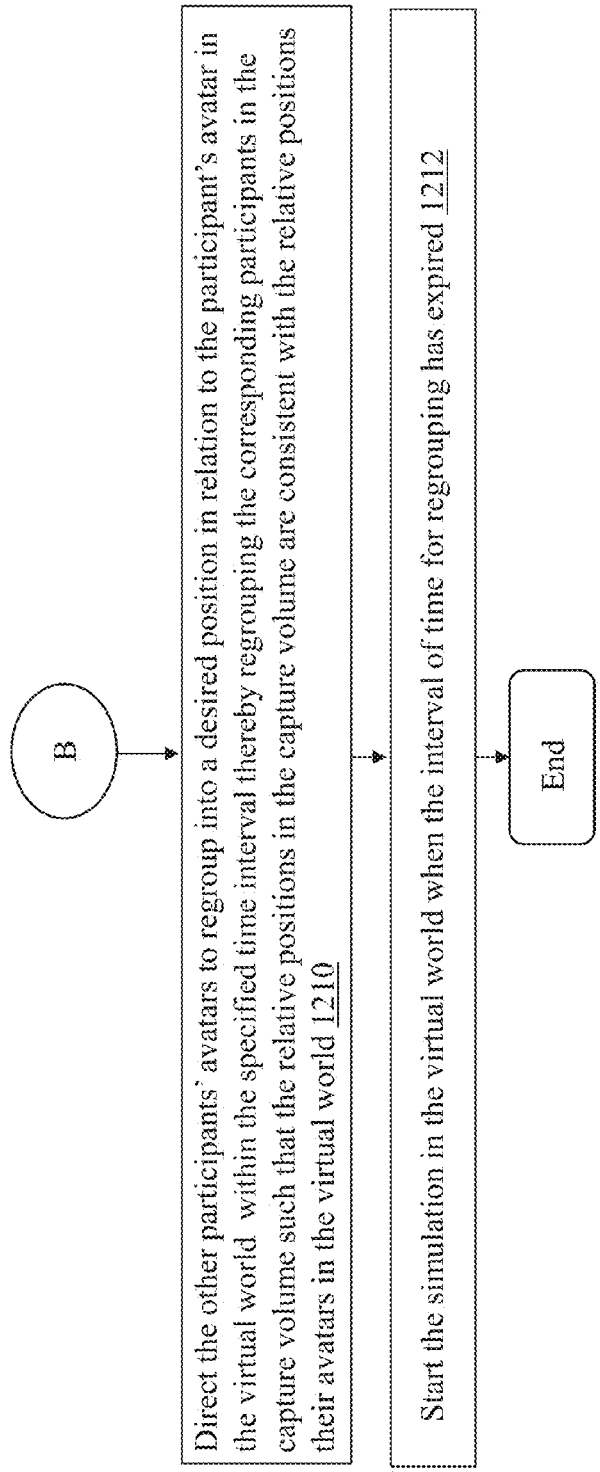
Figure 13A:
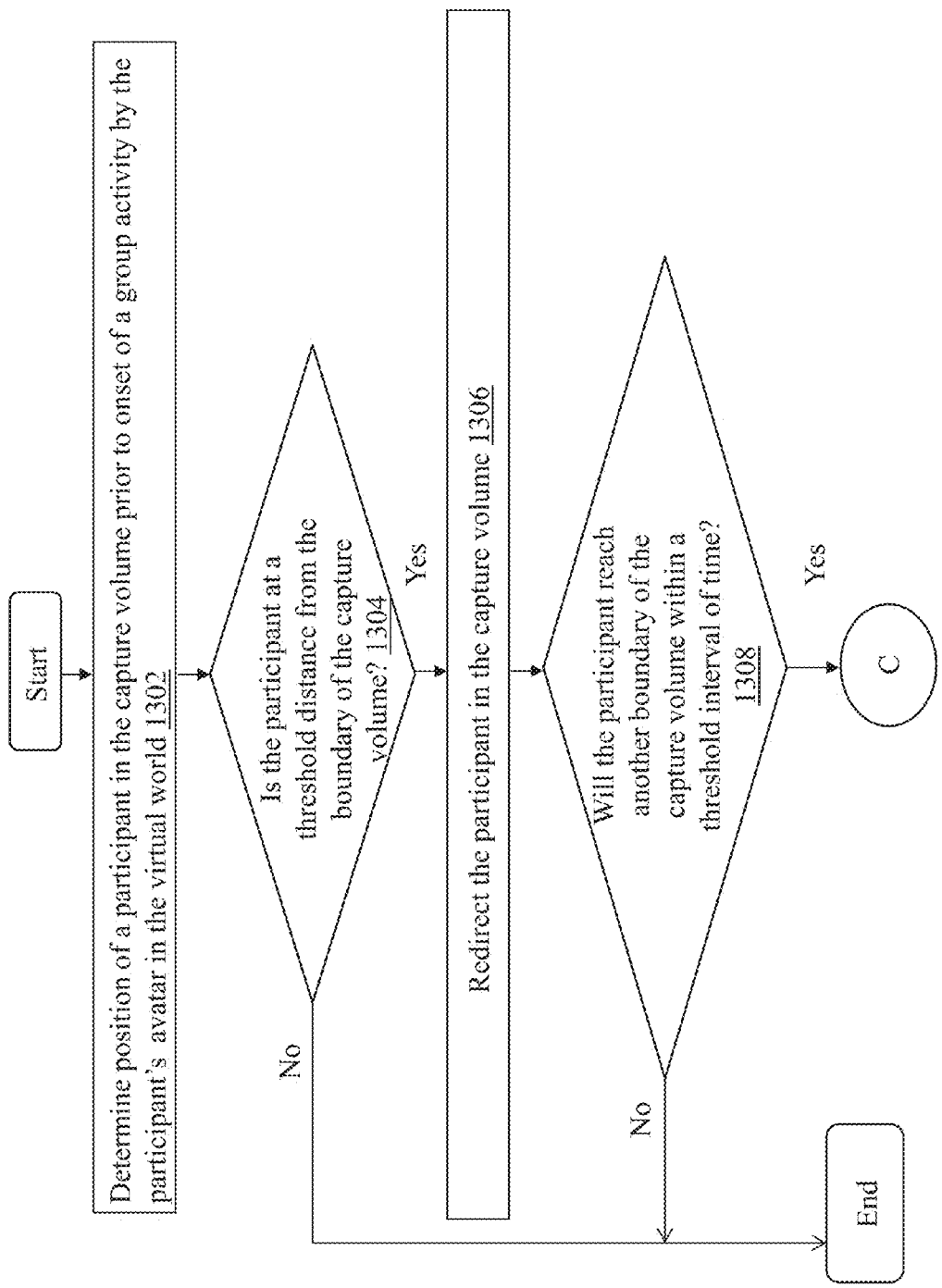
FIGS. 13A and 13B (collectively 'FIG. 13') is a flow chart that illustrates a process of repositioning one or more entitys within a capture volume prior to initiation of a group activity in the virtual world, according to certain exemplary embodiments of the present invention.
Figure 13B:
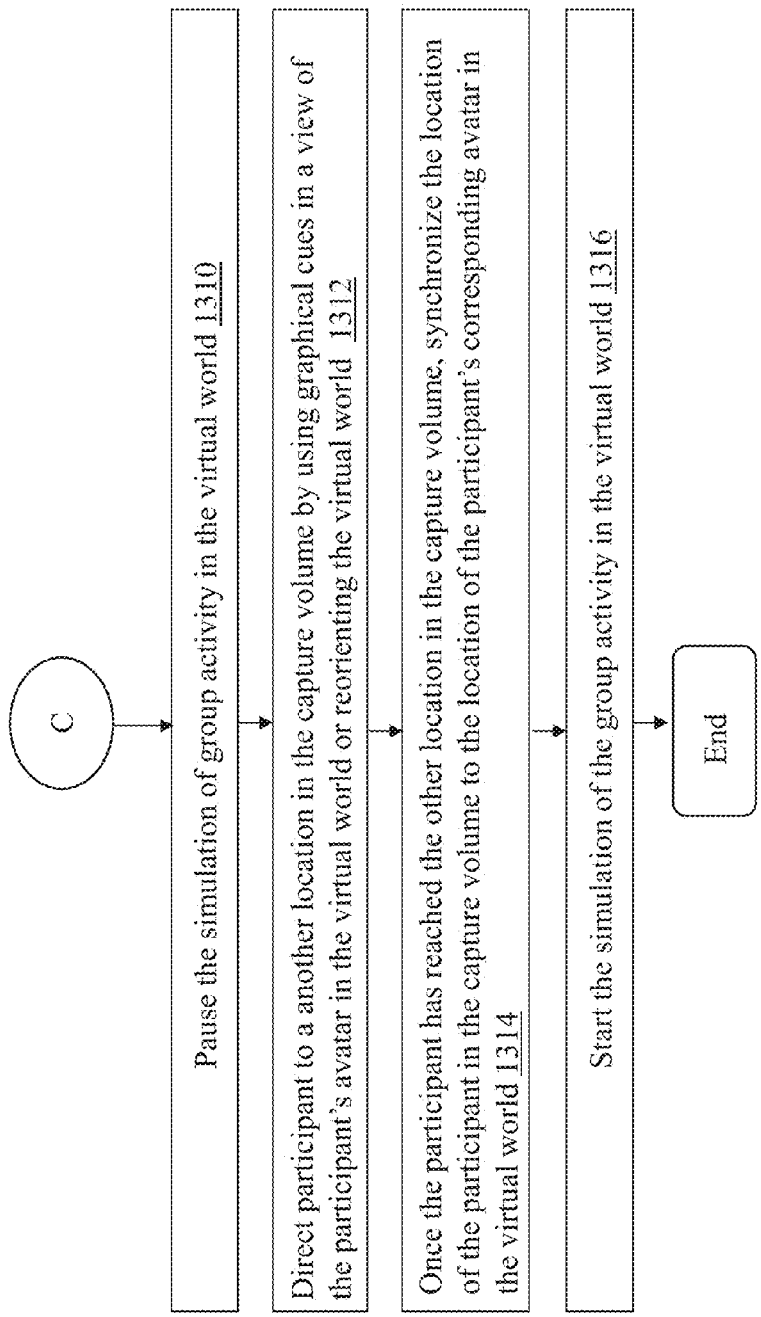

Technology for navigation in a virtual environment having real-world elevation characteristics using motion capture will now be described in greater detail with reference to FIGS. 1-13, which describe representative embodiments of the present invention. FIGS. 1, 2, 3, 4 and 5 describe a representative motion capture simulation system, as an exemplary embodiment of a motion capture simulation environment. FIGS. 6-9 describe methods for navigating a participant's avatar through a virtual environment while avoiding a collision of the participant with another participant in the capture volume using suitable illustrations and flowcharts. FIGS. 10-11 describe a method for regrouping participants in a capture volume using a common virtual room in the virtual environment using suitable illustrations and flowcharts. FIGS. 12-13 describe another method for regrouping and repositioning participants using suitable illustrations and flowcharts.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples"

or "exemplary embodiments" given herein are intended to be non-limiting and among others supported by representations of the present invention.

Moving now to discuss the figures further, an exemplary embodiment of the present invention will be described in detail. First, FIGS. 1-5 will be discussed in the context of describing a representative operating environment suitable for practicing certain embodiments of the present invention. FIGS. 6-13 will be discussed, making exemplary reference back to FIGS. 1-5 as may be appropriate or helpful.

As further discussed below and in accordance with certain embodiments of the present invention, FIG. 1 illustrates an exemplary system that is useful for motion capture simulation, while FIGS. 2, 3, 4, and 5 illustrate exemplary system elements.

Referring now to FIG. 1, this figure illustrates an exemplary motion capture simulation system 100, according to certain exemplary embodiments of the present invention. In particular, FIG. 1 illustrates a capture volume 102, a motion capture device 104, a capture entity 106, a wearable gear 108, makers 110 coupled to the wearable gear 108, a head mounted display device (hereinafter "HMD" device) 112, a wearable computing device 114, a virtual environment 118, and an avatar 116.

A motion capture simulation system 100 (hereinafter "motion capture system") can include a capture volume 102 where a number of capture entities 106 (e.g., participants) can participate together in a simulated scenario in a virtual environment 118. In one example embodiment, the capture volume 102 as discussed herein may be constrained by boundaries, for example walls. Even though the following description focuses on capture volumes having boundaries, one of ordinary skill in the art can understand and appreciate that other open architecture of the capture volume is not outside the broader scope of this disclosure.

As described earlier, the capture entity 106 as illustrated in FIG. 1 can be any object in the capture volume 102 that is motion captured into the simulated virtual environment 118 using a motion capture device 104. In one example embodiment, the capture entity 106 can be a living being (participant), such as a human being. In another example embodiment, the capture entity 106 can be any physical inanimate object (weapon, weapon model, racket, wand, stick, etc.) in the capture volume 102. In some embodiments, the capture entity 106 can be both a participant and equipment associated with the participant, such as a weapon held by a participant.

In one embodiment, a motion capture device 104 in the capture volume 102 can capture (quantitatively assess) the movement and/or actions of the capture entity 106 and process it to generate corresponding motion capture data. Alternatively, a tracking system 408 may process the movement and/or action of the capture entity obtained from the motion capture device 102 to generate the motion capture data. In one embodiment, when the capture entity 106 is a participant, the motion capture data can include, inter alia, a position along an x-y-z axes, an orientation along the axes of rotation, and/or a velocity of movement of the participant. When the capture entity 106 includes ammunition and/or a model of the ammunition, the motion capture data can include, inter alia, a position, an orientation and/or a velocity of movement of the ammunition and/or a model of the ammunition. In another embodiment, the motion capture data can include a position, an orientation, and velocity of movement of both the participant and the object associated with the participant.

The motion capture data of the capture entity 106, along with other capture entity-specific information such as sound and physiological data, can be used by the motion capture system 100 to control the behaviors and/or interactions of participant avatars in the simulated virtual environment 118. Further, such data from the capture entity 106 can be used by an artificial intelligence algorithm of the motion capture system 100 to control a reaction of virtual characters. It should be noted that an action of the virtual character is not controlled by the action of the participant in the capture volume, rather, a reaction of the virtual character is affected by the action of the participant in the capture volume 102. For example, when the participant raises his gun for aiming the participant's avatar does the same in the virtual world. In said example, if the avatar is pointing the gun at a virtual character, the virtual character may get defensive as controlled by the artificial intelligence algorithm (e.g., point a gun back at the avatar, run in zigzags, hide, and so on). The action of the virtual character may be controlled by an artificial intelligence algorithm.

Operation 1 as shown in FIG. 1, illustrates a capture entity 106 (hereinafter 'participant') preparing to participate in a simulation scenario in the virtual environment 118. In one embodiment, to participate in such a simulation, a capture entity 106 such as a participant (e.g., living being) can don a wearable computing device 114. The peripherals of the wearable computing device 114 can include, but are not limited to the HMD 112, a microphone, a set of headphones and/or a computing device capable of transmitting, receiving and/or processing data. Further, the participant can be outfitted with a wearable gear (e.g., clothing, equipment, etc). In one embodiment, retro reflective markers 110 and/or other items for tracking the participant's movement in the capture volume 102 may be attached to the wearable gear. In some embodiments, the motion capture system 100 can track the participants even without any markers.

In operation 2, after appropriate preparation (e.g., suiting up), the participant 106 can register with the motion capture system 100. The operation of registering can include creating an avatar for the participant 106 in the virtual environment 118. Further registering as a participant 106 can include establishing an association between the participant's wearable computing device 114 and the participant's avatar 116. After being registered, the participant 106 is now free to join other participants 106 in the simulated scenario. While in the capture volume 102, the motion capture system 100 can determine the position and actions (e.g., motion data) of the participant 106.

In Operation 3, the motion capture system 100 can integrate the participant 106 into the virtual environment 118 by driving the behavior and/or actions of the participant's avatar in the virtual environment 118 using the motion capture data of the respective participant 106. Further, the participant's avatar's view of the simulated virtual environment can be nearly simultaneously displayed in the participant's HMD 112. Once the participant 106 is integrated into the virtual environment 118 through his avatar 116, the participant 106 can explore the virtual environment 118 and/or participate in the simulated events in the virtual environment 118. In one embodiment, upon completion of the simulation scenario, the simulation can be optionally replayed for training or other purposes, as illustrated by operation 4 of FIG. 1. The motion capture system 100 is described in greater detail below, in association with FIG. 2.

Figure 2:
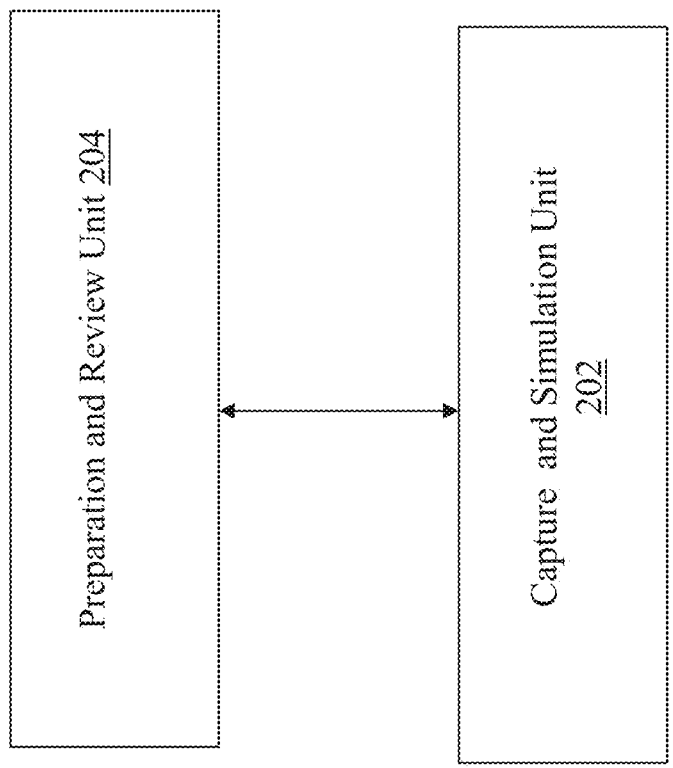
FIG. 2 illustrates a block diagram of a sensory immersive motion capture simulation system, according to certain exemplary embodiments of the present invention.

Referring now to FIG. 1 and FIG. 2, FIG. 2 illustrates a functional block diagram of the motion capture simulation system of FIG. 1, according to certain exemplary embodiments of the present invention. In particular, FIG. 2 illustrates a capture and simulation unit 202 and a preparation and review unit 204.

The capture and simulation unit 202 can be operable to obtain motion capture data associated with participants 106 disposed in the capture volume 102. The motion capture data can be obtained by capturing images and/or video recording the capture volume 102 in which the participants are disposed. The images and/or recordings of the capture volume 102 including the participants can be processed by the capture and simulation unit 202 to extract the motion capture data associated with the participants. Further, the capture and simulation unit 202 can use the motion capture data of each of the participants to drive the avatars of each participant in the virtual environment 118. One of ordinary skill in the art will understand and appreciate that even through capturing images and/or video recording the capture volume are specifically mentioned to obtain the motion capture data, they can be replaced with other tracking modalities without departing from the broader spirit of the invention.

In addition, the capture and simulation unit 202 can be operable to generate sensory feedback signals based on motion capture data and interactions of participants' avatars in the virtual environment 118. Further, the capture and simulation unit can transmit the feedback signals to the participants in the capture volume, creating a feedback loop. The feedback loop created by the participant's interaction with the data processed and emanating from the capture and simulation unit 202 provides an immediate and tactile experience drawing the participant into a belief that the experience is real (immersion). In one embodiment, the capture and simulation unit 202, can also generate and manage actions of AI characters in the virtual environment 118 using artificial intelligence algorithms.

The virtual environment 118 and the simulation scenarios can be generated and managed by the preparation and review unit 204. Further, the preparation and review unit 204 can be operable to prepare participants for taking part in the simulation scenario as described in operations 1-4 of FIG. 1. For example, the preparation and review unit can be operable to, inter alia, register the participant with the motion capture system 100, associate a participant to a corresponding avatar 116 in the virtual environment 118, associate the participant's wearable computing device 114 to the participant's avatar 116, scale the participant's avatar to match a physical dimension of the participant in the capture volume 102, and so on. Further, the preparation and review unit 204 can store the avatar of each participant and can provide the information that associates the participant to the avatar to the capture and simulation unit 202 for further processing. Accordingly, the capture and simulation unit 202 can be communicatively coupled to the preparation and review unit 204. In addition to providing information that associates the participant to the avatar, the preparation and review unit 204 can be operable to load a virtual environment 118 and/or a simulated scenario in the virtual environment 118 when requested by the capture and simulation unit 202. The capture and simulation unit 202 and the preparation and review unit 204 are described in greater detail below, in association with FIG. 3 and FIG. 4.

Figure 3:
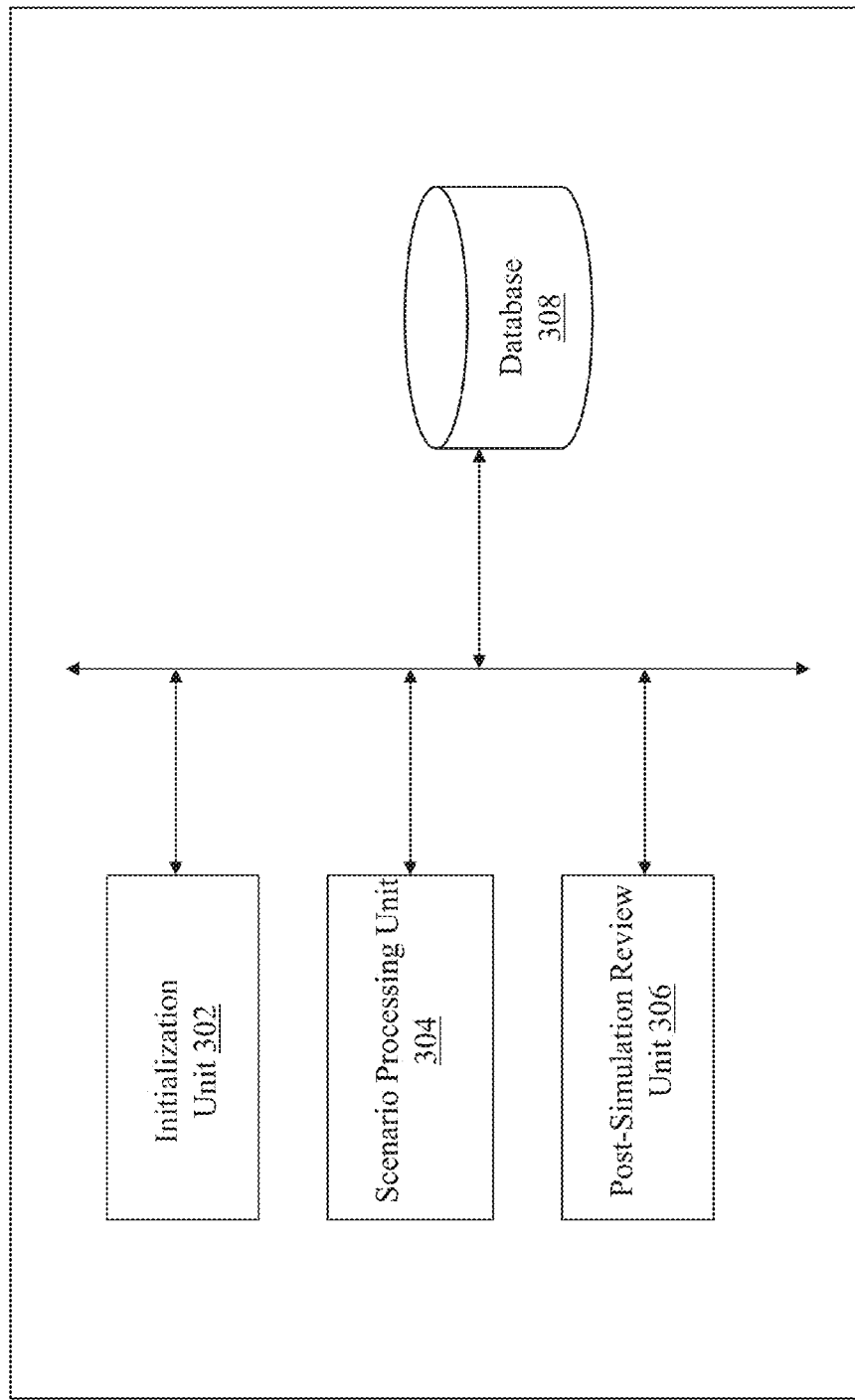
FIG. 3 illustrates a block diagram of a preparation and review unit of the sensory immersive motion capture simulation system, according to certain exemplary embodiments of the present invention.

Now referring to FIG. 2 and FIG. 3, FIG. 3 illustrates a functional block diagram of the preparation and review unit of FIG. 2, according to certain exemplary embodiments of the present invention. In particular, FIG. 3 illustrates an initialization unit 302, a scenario processing unit 304, a post simulation review unit 306 and a database 308.

The preparation and review unit 204 can include an initialization unit 302 that can be operable to prepare participants for taking part in the simulation scenario. To prepare the participants for the simulation, the initialization unit 302 can personalize the participant to the motion capture system 100 by first, associating the participant (wearing the wearable gear and/or the wearable computing device 114) with an avatar having the physical dimensions of an average sized human being. The physical dimensions of the average size human being can be predefined. Once the participant is associated with the avatar, the initialization unit 302 can scale the participant's avatar to approximately match the physical dimensions of the participant using position of the markers attached to the wearable gear donned by the participant. Then, the initialization unit 302 can store the relevant participant data, avatar data, scaling data and/or association data between the participant and the avatar in the database 308.

Further, the preparation of review unit 204 can include the scenario processing unit 304. The scenario processing unit 304 can include a data processing device capable of connecting to a distributed network (e.g., Internet). The scenario processing unit 304 can facilitate an operator (not shown in Figure) loading or modifying a virtual environment upon a request from the capture and simulation unit 202. Accordingly, the scenario processing unit 304 may provide a user interface that allows a user to design a virtual environment and modify the virtual environment as desired either while the simulation is running, before the simulation starts, and/or after the simulation ends. Further, the scenario processing unit 304 can be configured to import a virtual environment from an online source. Alternatively, the scenario processing unit 304 can import scenarios and store them in the database 308.

In the exemplary embodiment of FIG. 3, the processing and review unit 204 can further include the post simulation review unit 306. The post simulation review unit 306 can include a data processing device such as a computer, a display device and/or and audio output device. In one embodiment, the capture and simulation unit 202 can store the recorded simulation scenario in the database 308. The operator can play the recorded simulation scenario for post simulation training and/or other purposes. The capture and simulation unit 202 is described in greater detail below, in association with FIG. 4.

Figure 4:
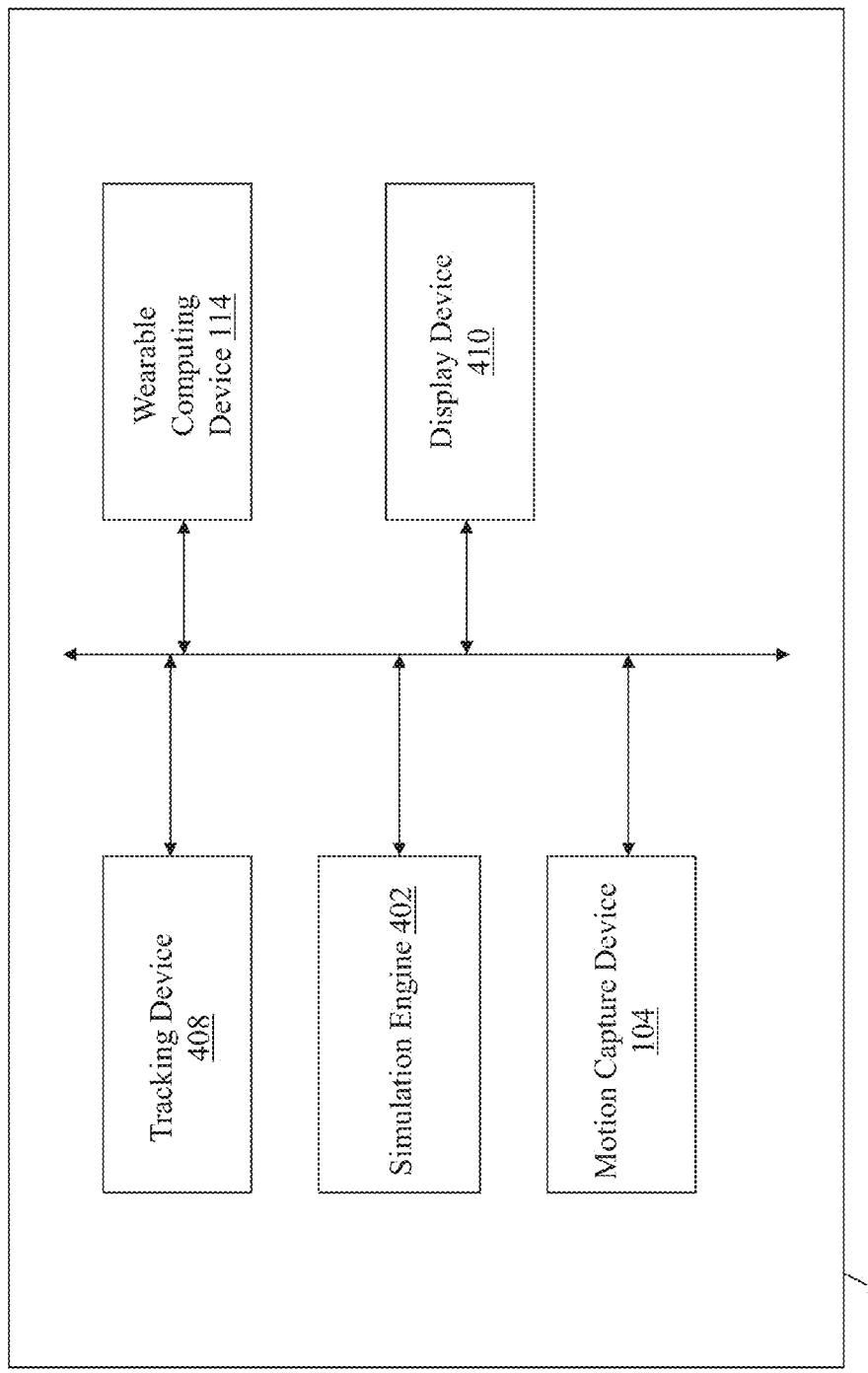
FIG. 4 illustrates a block diagram of a capture and simulation unit of the sensory immersive motion capture simulation system, according to certain exemplary embodiments of the present invention.

Now referring to FIG. 2 and FIG. 4, FIG. 4 illustrates a functional block diagram of the capture and simulation unit of FIG. 2, according to certain exemplary embodiments of the present invention. In particular, FIG. 4 illustrates a tracking system 408, a simulation engine 402, a motion capture device 104, a wearable computing device 114, and/or a viewer device 410.

The capture volume 102 can be under surveillance of the simulation engine 402 using a motion capture device 104. The motion capture device 104 can include a high speed camera that supports support high-speed image capture, as well as high-speed image processing and is operable to collect information about the locations of the markers (or the location of the subject in a markerless embodiment) as the participant 106 moves. The information collected by the motion capture device 104 can include images and/or video of the capture volume 102 and a participant 106 within the capture volume 102. In some embodiments, the motion capture system 100 can include more than one motion capture device. Each motion capture device 104 of the one or more motion capture devices may be connected to each other, as well as to a tracking system 408.

The information captured using the motion capture device 104 can be forwarded to the tracking system 408. The tracking system 408 can use the captured information from the motion capture device 104 to track and determine a motion of the participant 106 in the capture volume 102. Further, using the captured information, the tracking system 408 can determine 3D motion data (hereinafter "motion capture data") for each participant 106 in the capture volume. In one embodiment, the tracking system 408 can send the motion capture data (e.g., position, orientation, velocity, etc.) of the participant 106 to the wearable computing device 114 of the participant 106 and/or to the simulation engine 402.

As described above, the simulation engine 402 can receive motion capture data from the tracking system 408. In some cases, the simulation engine 402 may receive the motion capture data directly from the motion capture device 104. In addition to the motion capture data, the simulation engine 402 can receive auditory, tactile data, and/or olfactory data. The simulation engine 402 can process the received data (sensory data and/or the motion capture data) to generate sensory feedback signals for the capture entity 106 (e.g., participant) and to drive the participants' avatars in the virtual environment 118. Further, the simulation engine 402 can determine an elevation offset and/or orientation offset of the participants' avatars in the virtual environment 118. The determination of the offsets and adjustment of the avatars to compensate for the offsets will be described in greater detail further below in association with FIGS. 5-15.

The simulation engine 402 can transmit the feedback signals, as auditory data, visual data, tactile data and/or olfactory data, to the wearable computing device 114 of the capture entity 106. In addition to transmitting the feedback signals to the wearable computing device, the simulation engine 402 can transmit a simulation scenario to a display device 410. The display device 410 can process the video data and/or the simulation scenario to display the simulation to an external user. The display device 410 can include, inter alia a TV, a computer, a monitor, a LCD display, LED display and/or smart display. The display device 410 can display the simulation from different perspectives. The different perspectives may be displayed through a partitioned view over a single display interface such that an external user need not use multiple display devices to view the simulation from each perspective. In an alternate embodiment, the display device can include one or more display interfaces that are connected to each other. The simulation engine 402 will be described in greater detail below in association with FIG. 5.

Figure 5:
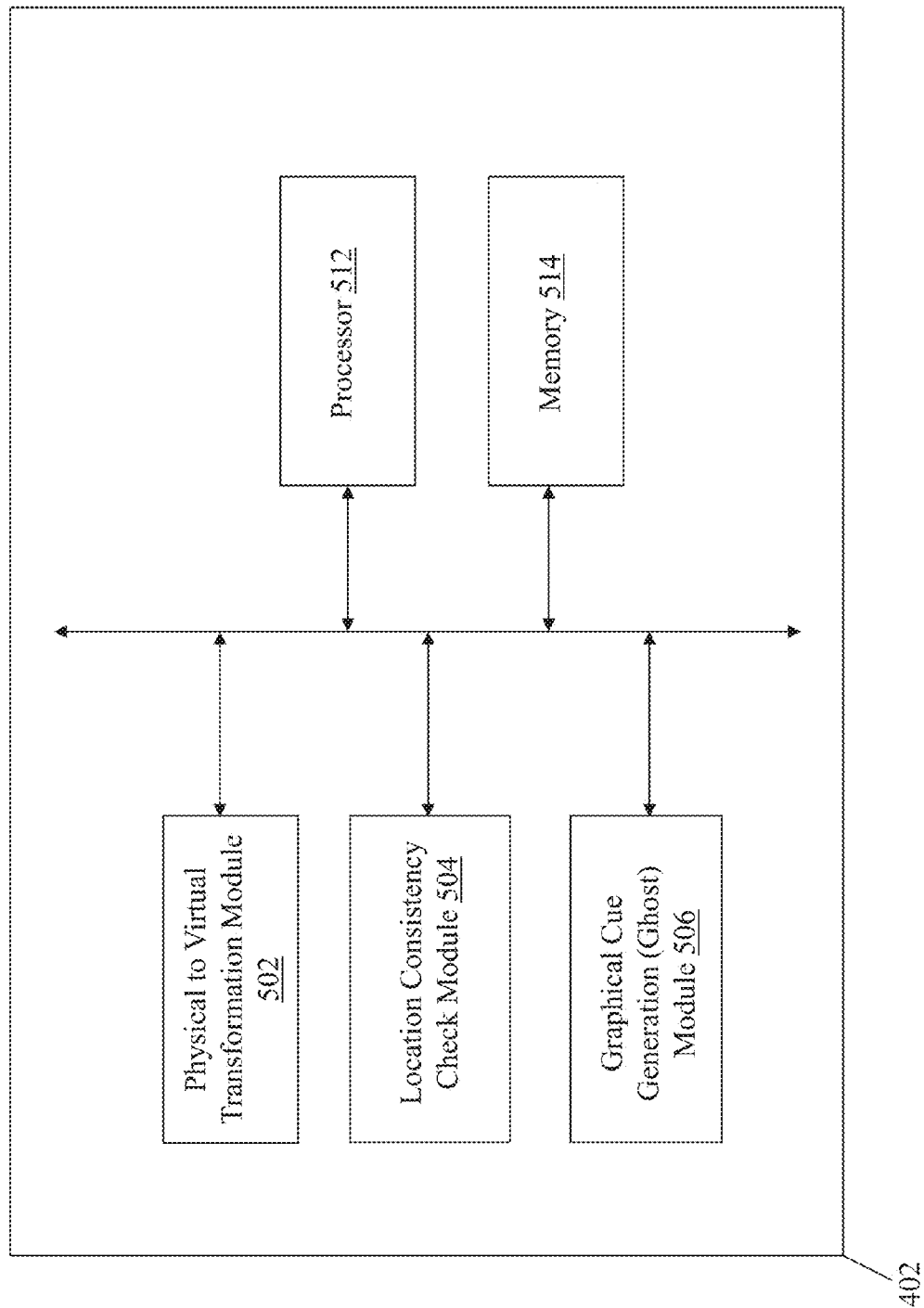
FIG. 5 illustrates a block diagram of a simulator engine of the capture and simulation unit, according to certain exemplary embodiments of the present invention.

Now referring to FIG. 4 and FIG. 5, FIG. 5 illustrates a functional block diagram of the simulation engine, according to certain exemplary embodiments of the present invention. In particular, FIG. 5 illustrates an physical to virtual transformation module 502, a location consistency module 504, an indicator module 506, a processor 512, and a memory 514.

The simulation engine 402 can be configured as a centralized system or a distributed system using one or more data processing devices such as computers mounted on a rack or computers distributed at remote locations and communicatively connected via a network.

In one embodiment, the simulation engine 402 can include a processor 512 that may be a multi-core processor and/or a combination of multiple single core processors. Further, the simulation engine 402 may include a memory 514 that is coupled to the processor 512. The memory 514 may be non-transitory storage medium or a transitory storage medium that may include instructions that when executed by the processor 512 may perform operations of the simulation engine 402. In other words, operations associated with the different modules 502-506 of the simulation engine 402 can be executed using the processor 512.

In one example embodiment, the simulation engine 402 includes a location consistency check module 504 (hereinafter 'location check module 504'). The location check module 504 can receive motion capture data associated with one or more participants 106 and/or objects in the capture volume 102 from one or more motion capture devices 104 or tracking devices in the capture volume 102. On the basis of the motion capture data, the location check module 504 can determine the location of each of the one or more participants 106 and/or objects in the capture volume 102. Once the location of the one or more participants 106 and/or objects are determined, the location check module 504 can determine whether the location of one participant relative to the location of an other participant (or object) in capture volume 102 matches (or is different from) a location of the participant's avatar relative to a location of the other participant's avatar in the virtual environment 118. For example, as described above, the participants 106 may be in close proximity to each other in the capture volume 102 while their avatars 116 may be separated by a larger distance either vertically (different floors in a building) or horizontally (in different virtual environments 118, or located far apart from each other, etc.) in the virtual environment 118.

In some embodiments, in addition to or in lieu of determining the location of the participants 106 and/or objects in the capture volume 102, the location check module 504 can determine an orientation of the participants 106 and/or objects in the capture volume. Further, the location check module 504 can check if the orientation of one participant relative to the orientation of an other participant in the capture volume 102 matches (or is different from) the orientation of the participant's avatar relative to the orientation of the other participant's avatar in the virtual environment 118. In yet another embodiment, the location check module 504 can make a similar determination for a direction of movement of the participants. In either case, once the location check module 504 determines that the relative locations, orientations, and/or directions of the movement of the participants 106 (or objects) in the capture volume 102 is different from the relative locations, orientations, and/or directions of the movement of the corresponding avatars 116 in the virtual environment 118, respectively, the location check module 504 communicates the result of the determination to the physical to virtual transformation module 502 (hereinafter 'transformation module').

Upon receiving the result of the determination, the transformation module 502 may compute a new or modified location for a participant's avatar. The new or modified location of the participant's avatar may be computed such that the new location of the participant's avatar relative to the location of another participant's avatar in the virtual environment 118 substantially matches a location of a participant relative to the location of the other participant in the capture volume 102. In some embodiments, upon computing the new or modified location, the transformation module 502 may transport the participant's avatar 116 from a current location in the virtual environment 118 to the new or modified location in the virtual environment 118. For example, in an embodiment associated with regrouping the participant in a capture volume 102, a participant's avatar 116 may be transported to the new or modified location in the virtual environment 118. In another embodiment, the transformation module 502 may maintain a current location of the participant's avatar 116 in the virtual environment 118 and instead of transporting the participant's avatar, a graphical cue corresponding to the participant 106 may be placed at the new or modified location in the virtual environment 118. For example, in an embodiment associated with avoiding a collision between participants in the capture volume 102, the corresponding avatars of the participants may maintain their current location in the virtual environment 118 while a graphical cue corresponding to the participants may be located at their respective new or modified location in the virtual environment 118.

In one embodiment, the transformation module 502 computes the new or modified location of a participant's avatar 116 based on transformation parameters used to map another participant from the capture volume 102 to the virtual environment 118. For example, a new or modified location of a first participant's avatar in the virtual environment 118 may be computed based on the transformation parameters used to map a second participant from the capture volume 102 to the virtual environment 118. In particular, to compute the new or modified location of the first participant's avatar, the parameters of the second transformation matrix, i.e., the translation and rotational parameters used to map the second participant to the virtual environment 118 may be applied to the motion capture data of the first participant.

In another embodiment, the transformation module 502 may map one or more participants from the capture volume 102 to a virtual room in the virtual environment 118 that is common to all the participants by applying identical transformation parameters to the motion capture data of each of the one or more participants.

In yet another embodiment, the transformation module 502 may determine if a new direction in which the participant is redirected upon approaching a boundary of the capture volume causes the participant to approach another boundary within a threshold interval of time. If so, the transformation module 502 may direct the participant to another direction that provides a more unrestrained mobility to the participant in the capture volume. Then, the transformation module 502 synchronizes the current location of the participant along the other direction with a location of the participant's avatar in the virtual environment.

The simulation engine 402 as illustrated in FIG. 5, further includes an indicator module 506. In one embodiment, the indicator module 506 can generate graphical cues. The dimension of the graphical cue may match a general dimension of a participant. However, the graphical cue may be designed such that they can be uniquely identified as an indicator even if the match the general dimensions of a participant. In one embodiment, the graphical cue may be transparent and the degree of transparency of the graphical cue can be controlled by the indicator module 506. For example, when a participant's avatar gets closer to the graphical cue in the virtual environment 118, the graphical cue becomes less transparent and when the participant's avatar gets farther away from the graphical cue, the graphical cue becomes more transparent. Further, the indicator module 506 can hide the graphical cue by making it invisible. In addition, the graphical cue may be designed such that a participant's avatar cannot interact with the graphical cue.

In addition to the graphical cue, the indicator module 506 may generate direction cues and/or timer cues. For example, in an embodiment where participants are to regroup in the capture volume or a participant has reached a boundary of the capture volume, the indicator module 506 generates directional cues to guide the participants to a certain location either in the capture volume 102 or in the virtual environment 118. The timer cue may include a countdown timer, a regular timer, a stop watch, or other time based indicators, that are displayed in the virtual environment 118 by the indicator module. Even though this description focuses on directional cues and graphical cues, one of ordinary skill in the art can understand and appreciate that any other appropriate cue may be rendered and displayed in the virtual environment without departing from the broader scope of this description.

Now turning to FIGS. 6-13, first, FIGS. 6-9 describe methods for navigating a participant's avatar through a virtual environment while avoiding a collision of the participant with another participant in the capture volume using suitable illustrations and flowcharts. Then, FIGS. 10-11 describe a method for regrouping participants in a capture volume using a common virtual room in the virtual environment using suitable illustrations and flowcharts, followed by FIGS. 12-13 that describe another method for regrouping and repositioning participants using suitable illustrations and flowcharts.

Graphical Cue to Avoid Collision Between Participants in the Capture Volume

Figure 6:
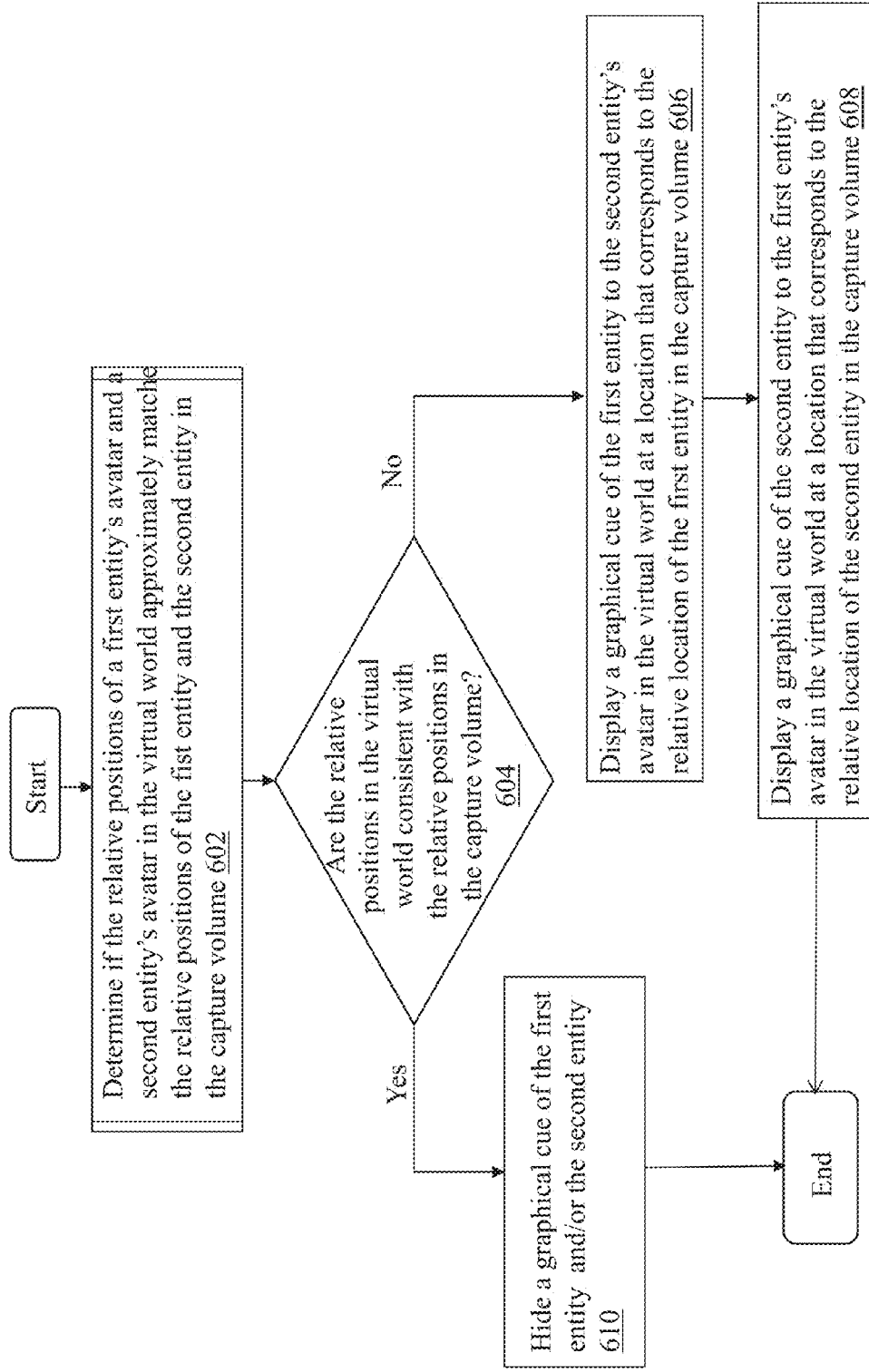
FIG. 6 is a flowchart that illustrates a process of preventing collisions with a physical entity in the capture volume while navigating in the virtual world, according to certain exemplary embodiments of the present invention.

Turning to FIGS. 6-9, FIG. 6 is a flowchart that illustrates a process of preventing collisions with a physical entity in the capture volume while navigating in the virtual world, according to certain exemplary embodiments of the present invention. FIG. 6 will be described by making exemplary reference to FIGS. 7, 8 and 9 as may be appropriate or helpful.

Figure 8:
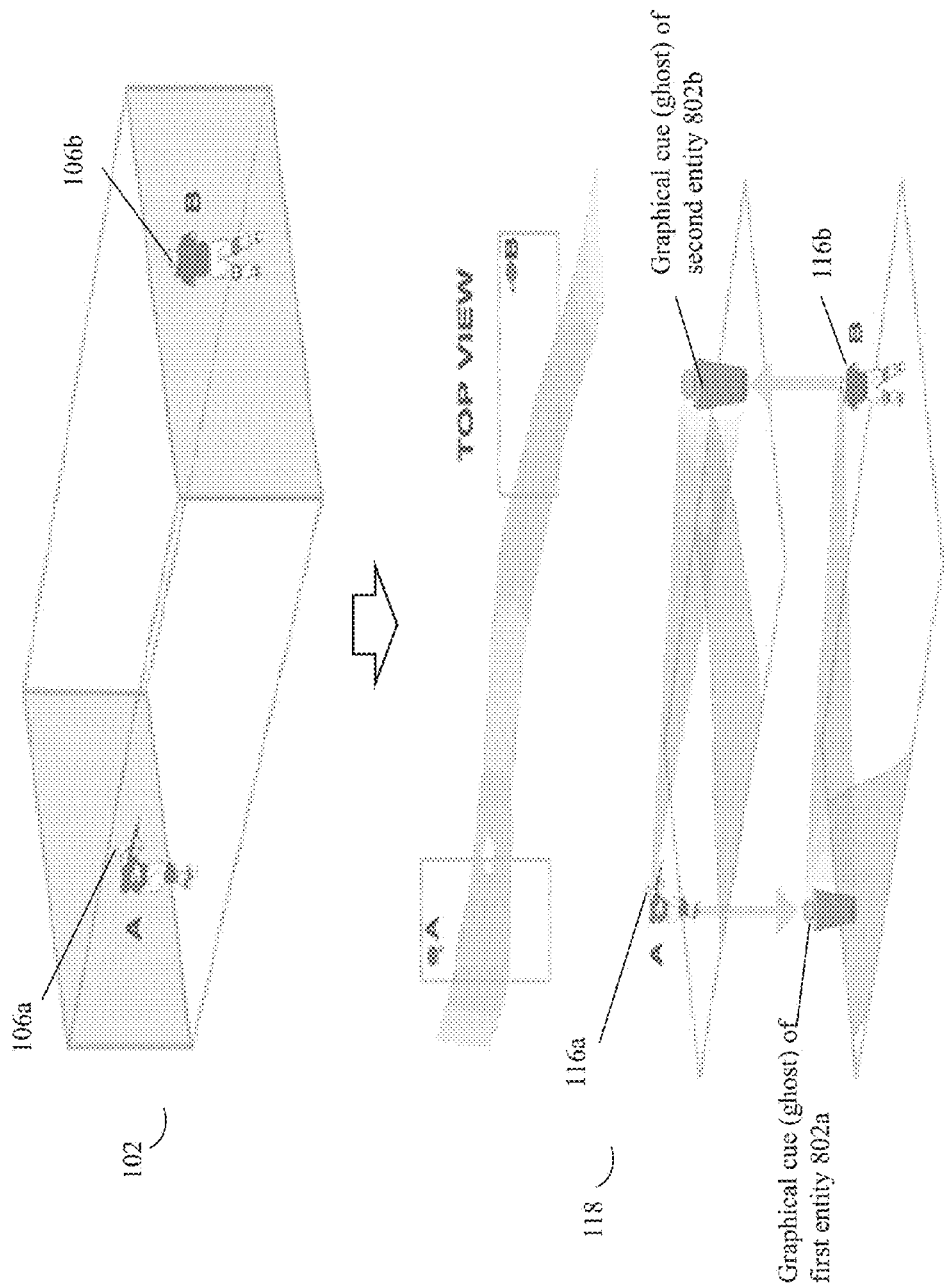
FIG. 8 illustrates an exemplary graphical representation corresponding to the process of preventing collisions with a physical entity in the capture volume while navigating in one environment in the virtual world, according to certain exemplary embodiments of the present invention.

In one example, for captures involving multiple participants it is typical at the initiation of the motion capture for all participants to have the same distance and angle preserving mapping from the capture volume 102 into the virtual world 118. That is, the relative distance and orientation of a second participant 106b (shown in FIGS. 8 and 9) with respect to the first participant 106a in the capture volume 102 is the same as the relative distance and orientation of second participant's avatar 116b with respect to the first participant's avatar 116a in the virtual world 118. Thus, as long as all participants 106 are utilizing the same mapping from the capture volume 102 to the virtual world 118 the participants 106 can avoid collisions in the capture volume 102 simply by avoiding collisions with the other participants' avatars 116 in the virtual world 118. However, when each participant reaches a boundary of the capture volume 102, the simulation engine 402 redirects the participants 106 and the transformation module 502 modifies the participants' mappings (transformation parameters in second transformation matrix, rotational and translational parameters) from the physical world (capture volume 102) into the virtual world 118. Accordingly, the relative distances and orientations of the participants 106 in the capture volume are no longer the same as the relative distances and orientations of their avatars in the virtual world 118, as illustrated in FIG. 8. Thus, the first participant 106a can no longer avoid real-world collisions with the second participant 106b by simply avoiding the second participant's avatar 116b in the virtual world 118, since their relative location nor orientation no longer holds for the capture volume 118.

Figure 9:
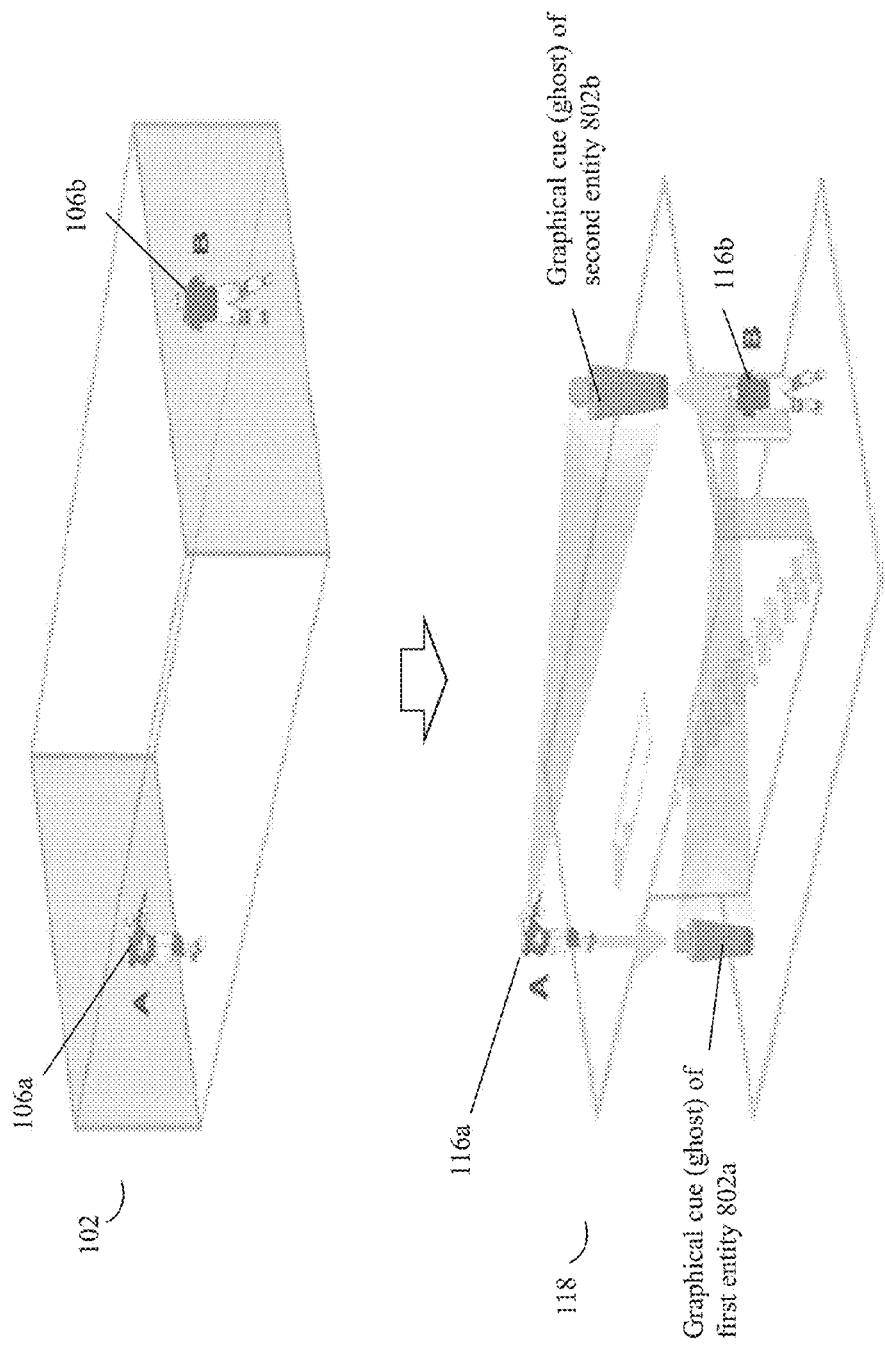
FIG. 9 illustrates an exemplary graphical representation corresponding to the process of preventing collisions with a physical entity in the capture volume while navigating in another environment in the virtual world, according to certain exemplary embodiments of the present invention.

In another example, in the case of multiple participants 106 navigating a virtual world 118 that has distinct levels, such as a two story building, as illustrated in FIG. 9, it is possible for the different participant's avatars to occupy the same longitudinal/lateral planar location but at different heights. For example, a first participant's avatar 116a is at location P on the first floor in the virtual world 118 and then a second participant's avatar 116b walks up the stairs to the second floor and navigates to the position on the second floor that is exactly above position P on the first floor in the virtual world 118. But for this to happen, in the capture volume 102, the first participant 106a and second participant 106b must occupy the exact same position, which of course is not possible. Each participant maintains his own unique mapping from the capture volume 102 into the virtual world 118. For the example case under consideration these mappings are the same except for the vertical component, that is if the first participant 106a stands at position Pc in the capture volume 102, then the first participant's avatar 116a will be at position V1 in the virtual world 118 and if second participant 106b also stands at position Pc in the capture volume 102, then the second participant's avatar 116b will be at position V2 in the virtual world 118 where V1 and V2 are identical except for differences in the vertical components brought about by navigating to different levels in the virtual world.

In either of the above-mentioned cases, to avoid collision between participants 106 in the capture volume 102 while they navigate through a virtual environment 118, initially, in operation 602, the location check module 504 of the simulation engine 402 determines if the location of the first participant 106a (shown in FIGS. 8 and 9) relative to the location of the second participant 106b is different from the location of the first participant's avatar 116a relative to the location of the second participant's avatar 116b. The process 602 of determining whether the relative locations of the participants in the capture volume 102 is different from the relative location of their respective avatars in the virtual world 118 is described below in greater detail in association with FIG. 7.

Figure 7:
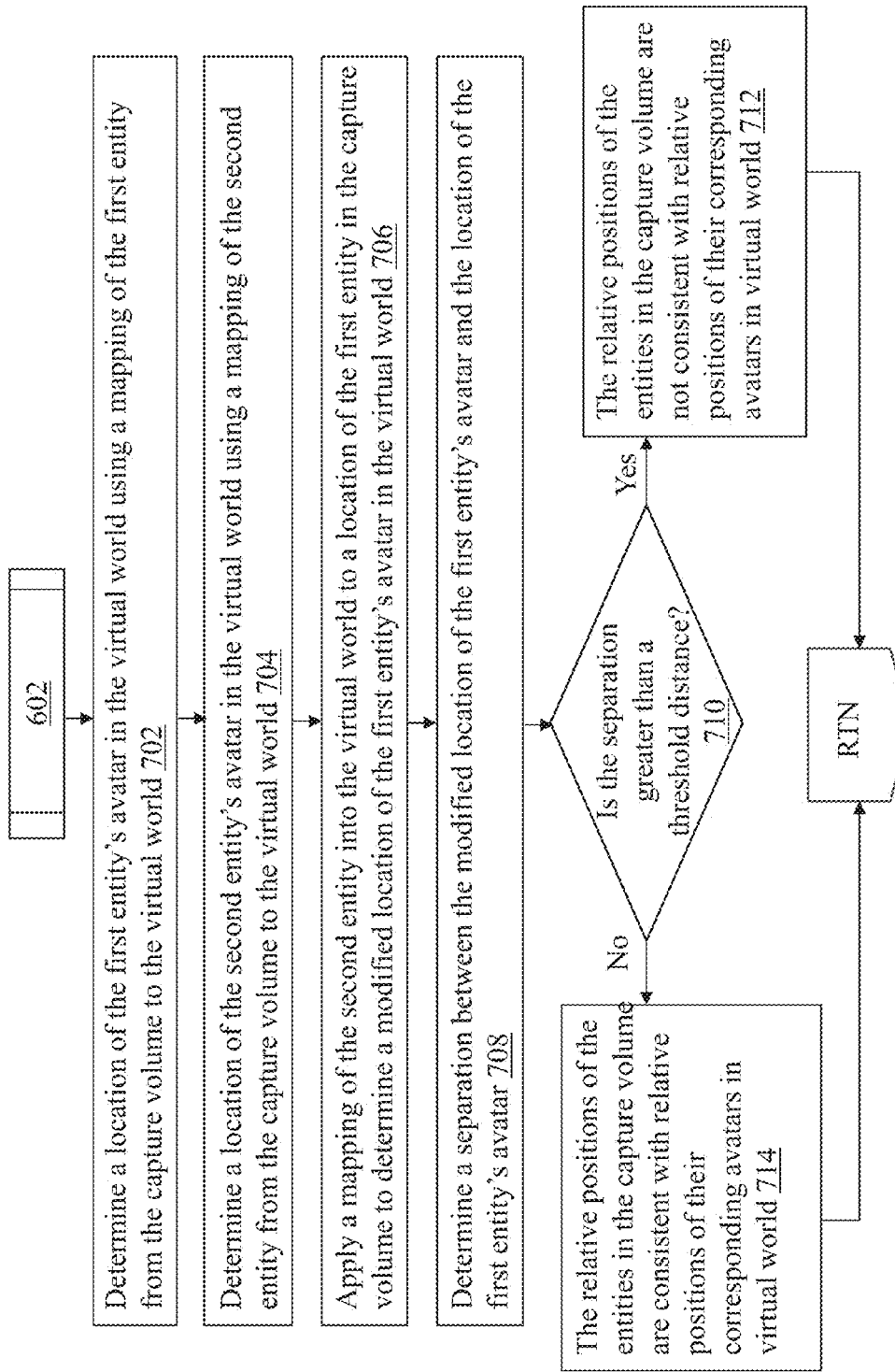
FIG. 7 is a flowchart that illustrates a process of determining if the relative positions of physical entities' avatars in the virtual world is consistent with relative positions of the physical entities in the capture volume, according to certain exemplary embodiments of the present invention.

Now turning to FIG. 7, this figure is a flowchart that illustrates a process of determining if the relative positions of physical entities' avatars in the virtual world is consistent with relative positions of the physical entities in the capture volume, according to certain exemplary embodiments of the present invention. The process begins at operation 702 where the location check module 504 determines a location of the first participant's avatar 116a in the virtual world 118 using the motion capture data associated with the first participant 106a in the capture volume 102. In particular, the location check module 504 can apply transformation matrices to the motion capture data associated with the first participant 106a to map the first participant 106a from the capture volume 102 to the virtual world 118. The resulting location in the virtual world 118 to which the first participant 106 is mapped may be determined as the location of the first participant's avatar 116a in the virtual world 118. Similarly, in operation 704, the location check module 504 determines the location of the second participant's avatar 116b in the virtual world 118 based on motion capture data associated with the second participant 106b in the capture volume 102.

Once the locations of the participants' avatars 116a,b in the virtual world 118 are determined, in operation 706, the location module 504 in combination with the transformation module 502 may compute a modified location for each of the first entity's avatar 116a and the second entity's avatar 116b. In particular, in operation 706, the location module 504 in concert with the transformation module 502 can compute a modified location of the first participant's avatar 116a by applying, to the location of the first participant in the capture volume 102, a mapping of the second participant 106b used to map the second participant 106b from the physical world into the virtual world. That is, first, the transformation module 504 determines a location of the first participant 106a in the capture volume 102 using the motion capture data associated with the first participant 106a. Then, the transformation module 504 maps the first participant 106 to a Cartesian co-ordinate system (frame) using a first transformation matrix as described earlier. Next, instead of using a second transformation matrix associated with mapping the first participant 106a from the Cartesian co-ordinate system to the virtual world co-ordinate system, the transformation module 504 maps the first participant 106a from the Cartesian co-ordinate system to the virtual world co-ordinate system using a second transformation matrix associated with mapping the second participant 106b from the second participant's Cartesian co-ordinate system to the second participant's virtual world co-ordinate system.

In a similar manner, in operation 706, the transformation module 502 computes the modified location of the second participant's avatar 116b based on a transformation used to map the first participant 106 from the capture volume 102 to the virtual world 118.

Once the modified locations of each other participants' avatars are computed, in operation 708, the location check module 504 compares a location of each participant's avatar as computed in operations 702 and 704 with their modified locations as computed in operation 706. In particular, in operation 708, the location check module 504 compares and determines a separation in distance between a location of the first participant's avatar 116a in the virtual world 118 and the modified location of the first participant's avatar 116a. Similarly, the location check module 504 compares and determines a separation in distance between a location of the second participant's avatar 116a in the virtual world 118 and the modified location of the second participant's avatar 116a.

Further, in operation 710, the location check module 504 determines if the separation of distance between the location of a participant's avatar 116 and a modified location of a participant's avatar 116 is greater than a threshold distance. If a separation between the location of the participant's avatar 116 in the virtual world 118 and the modified location of the participant's avatar in the virtual world 118 is greater than a threshold distance, then, in operation 712, the location module 504 concludes that the relative locations of the participants 106 in the capture volume 102 are different from the relative locations of their respective avatars 116 in the virtual world 118. However, if the separation between the location of the participant's avatar 116 in the virtual world 118 and the modified location of the participant's avatar 116 in the virtual world 118 is less than a threshold distance, then, in operation 714, the location check module 504 may conclude that the relative locations of the participants 106 in the capture volume 102 match the relative locations of their respective avatars 116 in the virtual world 118. Upon determining the result of the comparison, the location module 504 returns back to operation 604 of FIG. 6.

Referring back to FIG. 6, in operation 604, the location module 504 checks if the relative locations of the participants' avatars 116 in the virtual environment 118 are identical or substantially consistent with the relative locations of the participants 106 in the capture volume 102. Alternatively, in one example embodiment, operation 604 may be omitted and the simulation engine 402 can proceed to operations 606 and 608, or 610 based on the results of the check from 710 without departing from a broader spirit of the disclosure.

On the basis of the result of the check in operation 710, if the modified locations of the participants' avatars 116 in the virtual world 118 are different from their relative locations of their respective participants 106 in the capture volume 102, then, in operations 606 and 608, the location check module 504 communicates with the indicator module 506 to render a graphical cue 802 (shown in FIGS. 8 and 9) corresponding to the participant 106 and place the graphical cue 802 at the modified location of the participant's avatar 116. In particular, the indicator module 506 is instructed to generate a graphical cue 802a corresponding to the first participant 106a and place it at the modified location of the first participant's avatar 116a. Further, the graphical cue 802a corresponding to the first participant 106a is displayed to the second participant 106b in a view of the virtual environment provided to the second participant 106b. Similarly, the indicator module 506 is instructed to generate a graphical cue 802b corresponding to the second participant 106b and place it at the modified location of the second participant's avatar 116b. In other words, the graphical cue 802a corresponding to the first participant 106a is displayed to the second participant 106b and the graphical cue 802b corresponding to the second participant 106b is displayed to the first participant 106a.

As described earlier, the virtual world displayed to the first and second participant may be different from each other. That is, the virtual world 118 displayed to the first participant 106a is based on a mapping of the first participant 106a from the capture volume 102 to the virtual world 118 and from a perspective of the first participant's avatar 116a. Similarly, the virtual world 118 displayed to the second participant 106b is based on a mapping of the second participant 106b from the capture volume 102 to the virtual world 118 and from a perspective of the second participant's avatar 116b.

Referring back to operation 604, if the relative locations of the participants' avatars 116 in the virtual world 118 are identical or substantially consistent with the relative locations of their respective participants 106 in the capture volume 102, then, in operation 610, the location check module 504 communicates with the indicator module 506 to place the graphical cue 802 at the modified location of the participant's avatar 116, and make the graphical cue 802 invisible (that is, to not render the graphical cue) to the other participants and/or their respective avatars. In particular, the graphical cue 802a corresponding to the first participant 106a is made invisible in the virtual environment displayed to the second participant 106b and the graphical cue 802b corresponding to the second participant 106b is made invisible in the virtual environment displayed to the first participant 106a.

It must be noted that, in either case, the graphical cue of a participant is computed, but the decision to display the graphical cue or make the graphical cue invisible is made based on a comparison of the relative locations of the participants' avatars 116 in the virtual environment 118 with their relative locations of the respective participants 106 in the capture volume 102. In addition, it must be noted that a graphical cue corresponding to a participant may be displayed even after the participant's avatar is dead in the virtual environment 118. This is because, even if the participant's avatar is dead, the participant that drives the avatar may be alive and moving around in the capture volume 102 and other participants may collide with the participant whose avatar is dead. To avoid such collisions and for safety of all the participants, the graphical cue of the participant whose avatar is dead is displayed to the other participants.

In one example embodiment, the graphical cue 802 can be mostly transparent, so as to not disrupt the actual execution of the virtual world scenario as illustrated in FIGS. 8 and 9. The transparency of the graphical cue 802 can change as a function of the distance of the graphical cue from the participant to which it is displayed, becoming more transparent as the distance increases. This cue can resemble the person in general dimensions but be unique so as to be obvious as only an indicator.

It must be noted that, since the location of a participant's avatar in the virtual world and the modified location of another participant's avatar in the virtual world are computed using the same mapping from the physical world into the virtual world (i.e., the mapping of the participant from the capture volume to the virtual world), the relative locations and orientations for the participant and the other participant in the real-world are now the same as the relative locations and orientations for the participant's avatar and the modified location and orientation of the other participant's avatar 116b in the virtual world. Accordingly, using the graphical cue placed at the modified location of the other participant's avatar, the participant can avoid any real-world collisions with the other participant by avoiding the graphical cue of the other participant placed at the modified location in the virtual world.

Regrouping Participants in a Capture Volume by Mapping Respective Avatars to a Virtual Room In one example, multiple participants may be allowed to maneuver independently throughout the virtual world 118. These participants 106 will eventually reach the boundary of the capture volume 102 and they will be redirected in a different direction in the capture volume 102 while their respective avatars continue along a previous direction in the virtual environment 118. The redirection will result in different mappings for each participant from the capture volume 102 into the virtual world 118. After some time, there may be parts of the motion capture exercise where it may be required or desired that the relative distances between positions and/or orientations of the participants in the capture volume once again match the relative distances between, positions, and/or orientations of their respective avatars in the virtual world 118. Example scenarios of motion capture segments that could necessitate having the matching offsets can include, but not limited to, room clearing, requiring physical contact in a tight stacked formation, and carrying of one subject by another, e.g. a wounded soldier.

In one example, participant B may be located on the right hand side of participant A in the capture volume, and their respective avatars may have relative positions in the virtual world that are identical to their positions in the capture volume. In said example, participant A may reach the boundary of the capture volume and may be redirected to around by 180 degrees and move along a direction that is opposite to participant A's current direction of movement, while participant A's avatar does not change direction. When participant A changes direction of movement, participant B who used to be on the right hand side of participant A will be on the left hand side of participant A in the capture volume. However, their respective avatars don't change positions in the virtual environment. Now the relative positions of the participants in the capture volume are different from the relative positions of their respective avatars in the virtual environment. For some motion capture exercises, participant B may wish to reorganize such that participant B continues to be on the right hand side of participant A in the capture volume or they may wish to match their relative positions in the capture volume as they appear in the virtual environment. Accordingly, it may be desired to regroup the participants such that a match in relative positions, orientations, directions of movements and/or locations between the physical capture volume and the virtual world is established.

FIG. 10 is a flowchart that illustrates a process of regrouping physical entities in a capture volume using a common virtual room, according to certain exemplary embodiments of the present invention. FIG. 10 will be described by making exemplary reference to FIG. 11 as may be appropriate or helpful.

The process of regrouping the participants begins at operation 1002 where the simulation engine 402 receives a signal to initiate the regrouping process. In one example, the initiation signal may be sent by either a participant in a group training scenario, such as a participant who is team leader, a participant that is a trainer, and so on. In another example, the initiation signal may be sent by an operator of the simulation engine 402. In either case, once the signal to initiate the regrouping is received, in operation 1004 the simulation engine 402 computes new locations for each of the participants' avatars by applying similar transformation parameters to a location of each participant that needs to be regrouped. The new locations are computed such that the new location of the first participant's avatar 116*a* relative to the new location of the second participant's avatar 116*b* in the virtual environment 118 is consistent with the location of the first participant relative to the location of the second participant in the capture volume 102. In addition to computing the new locations, in operation 1004, the participants' avatars are relocated to their new locations.

The similar transformation parameters used to compute the new locations may be selected such that both the first participant 106*a* and the second participant 106*b* are mapped to a predetermined location 1102 in the virtual world that is common to both the first participant's avatar 116*a* and the second participant's avatar 116*b*. In other words, the similar transformation parameters may be selected such that the first and the second participant's avatars may be transported to a predetermined location 1102 in the virtual world from their current virtual environment.

In one example scenario, the predetermined location can be a location of a vehicle in the virtual environment 118 and the participants' avatars may be relocated to the vehicle and then they could move out and gather around the vehicle if desired. In said example, the scenario may be temporarily 'frozen' or paused while the participants organize themselves in the capture volume such that their respective avatars gather around the vehicle after they were relocated to the vehicle. Once the participants are organized, the simulation will be continued or the pause may be removed.

In another example scenario, the predetermined location can be any appropriate location in the virtual environment where the characteristics of the location and materials at the location may be modified. Such modifications may function as a cue to the participant for regrouping. For example, the participants' avatars may be relocated from a current location to another location in the virtual environment to another location in the virtual environment where the color of the environment may be changed, for example to a blue color, and the environment at the predetermined location becomes transparent, for example, walls become transparent. In addition, the AI characters may either be removed or temporarily frozen. Further, the placement of the avatars in the predetermined location may be such that the relative distances and orientations between the avatars in the virtual environment is consistent with the relative distances and orientations between their respective entities in the capture volume.

In another example, the predetermined location may be a room in the virtual environment. Hereinafter, the common predetermined location 1102 in the virtual environment 118 may be referred to as a rally room. The rally room 1102 is a virtual representation of the physical capture volume and it may be outside the virtual world of the motion capture exercise. The virtual rally room may also be considered as an intermediate stage between different motion capture exercise scenarios where participants' avatars are transported for regrouping their respective participants in the capture volume before entering the next motion capture exercise scenario.

In one example, the virtual rally room may be represented identical to the capture volume. The representation of the virtual rally room as identical to the capture volume may be a cue to the participants to aid a physical reorganization of the participants in the capture volume.

In the virtual rally room 1102, the participants' avatars appear at the same location and orientation in the rally room 1102 as the participants are in the capture volume 102. Accordingly, at initiation of the switch to the rally mapping each participant's avatar will be located at some new location and orientation in the virtual rally room 1102 that is consistent with their location in the capture volume 102. Once the participants' avatar are relocated to their new locations in the virtual rally room, the participants can physically regroup in the capture volume 102 to execute the next phase of the exercise. Even though typically the virtual rally room does not include AI characters, in one or more embodiments, the virtual rally room can include AI characters if desired. Further, the virtual rally room mode may be used in combination with the graphical cue mode described above in association with FIGS. 6-9 such that a graphical cue of any inanimate object in the capture volume 102 is displayed in the virtual rally room to each participant. For example, the virtual rally room may include a graphical cue of a pillar in the capture volume. In said example, the graphical cue may help in preventing the participants from colliding with the pillar when regrouping.

In one embodiment, in operation 1006, directional cues may be provided in the virtual environment displayed to the participants to direct the participants to a target location after being transported to the new location in the virtual rally room 1102. In another embodiment, virtual props may be provided in the virtual rally room and the participants may be directed organize themselves based on the virtual prop. For example, after relocating the participants' avatars to the virtual rally room 1102, the simulation engine 402 may place a virtual vehicle in the virtual rally room 1102 as it may appear in the next motion capture simulation scenario to which the participants' avatars may be transported. Accordingly, in said example, the participants can organize themselves in such a way that their respective avatars in the virtual rally room 1102 are placed at each door of the virtual vehicle in the virtual rally room 1102 or any location around the virtual vehicle as desired. This way, when the participant's avatars are transported back to the motion capture simulation scenario that involves the virtual vehicle, the avatars will not be placed on top of the car or in the car, rather they will be at their desired location with respect to the vehicle (e.g., at each door of the vehicle).

In some embodiments, in operation 1006, a virtual countdown clock or timer may be provided to indicate a time provided for the participants to regroup. Once the time runs down or the time interval for regrouping has exhausted, the participants' avatars may be automatically transported to a virtual world associated with their motion capture exercise. Alternatively, after regrouping, either programmatically or by command, participants' avatars may transition to the mapping that places the participants' avatars at the desired location and orientation in the virtual world ready to execute the next phase of the motion capture exercise. It must be noted that operation 1006 may be omitted without departing from a broader scope of the disclosure.

In one example as illustrated in FIG. 11, the first participant's avatar 116*a* may be in a first virtual world and the second participants avatar 116*b* may be in a second virtual world that is different from the first virtual world while the respective participants that drive them are located in the same capture volume 102. In said example, at some point, the simulation may require that the participants are located in the same virtual world 118 and the locations and relative distance between the first and second participant's avatars match the locations and relative distance between the first and second participant in the capture volume 10. Accordingly, either an operator, or the first or second participant initiates a request to regroup. Upon initiating a request to regroup, the first participant's avatar 116*a* gets relocated from the first virtual world 118*a* to a new location in the virtual rally room 1102 and the second participant's avatar 116*b* gets relocated from the second virtual world to a new location in the virtual rally room 1102. The new location of the first participant's avatar relative to the new location of the second participant's avatar in the virtual rally room may be consistent with the location of the first participant relative to the location of the second participant in the capture volume. Once the avatars are in the virtual rally room 1102, the avatars can be directed to organize themselves into a desired formation in the virtual rally room 1102 thereby organizing the corresponding participants in the capture volume 102 prior to a next phase of the motion capture exercise.

Regrouping Participants in a Capture Volume by Mapping all Participants to the Virtual World Based on One Participant's Mapping As described above, in one example embodiment, when the relative locations, orientations, and/or directions of movements of the participants 106 in the capture volume 102 are different from the relative locations, orientations, and/or directions of movements of their respective avatars in the virtual environment 118, the participants 106 may be regrouped by relocating the participants' avatars to the virtual rally room 1102. In addition to virtual rally room, other methods can be used to regroup the participants in the capture volume, one of which is described below in association with FIG. 12.

FIG. 12 is a flowchart that illustrates a process of regrouping physical entities in a capture volume by synchronizing the mapping of the physical entities, according to certain exemplary embodiments of the present invention. In operation 1202, the simulation engine 402 may receive a signal from either one of the participants or an operator to initiate a regroup of the participants in the capture volume 102. Accordingly, in operation 1204, the motion capture exercise in which the participants are involved is paused. Further, the simulation engine 402 selects one participant, such as a team leader, and determines a transformation used to map the selected participant from the capture volume 102 to the virtual environment 118 (herein 'mapping of the selected participant'). In one example embodiment, the participant that is selected may be the participant that initiated the regroup exercise. In another example embodiment, the participant may be selected automatically by the simulation engine 402. Once the mapping of the selected participant is determined, the simulation engine 102 applies the mapping of the selected participant to the motion capture data of the other participants in the capture volume to determine a new location of the other participants in the virtual environment 118. In other words, the other participants are mapped to the virtual environment 118 using the transformations that are used to map the selected participant from the capture volume 102 to the virtual environment 118.

Once the new locations are computed, in operation 1206, the avatar of the selected participant is placed at its current location in the virtual environment 118 while the avatars of the other participants in the virtual environment 118 gets transported to their respective new locations within the virtual environment 118 by the simulation engine 402. In other words, the view of the other participants gets synchronized with where they would be in relation to the selected participant in the capture volume 102. That is, when the avatars are placed at their new locations, the relative distances, orientations, and/or directions of the avatars at their respective new locations may be substantially identical to the relative distances, orientations, and/or directions of their respective participants in the capture volume. It must be noted that the participants' avatars are not transported to a virtual rally room 1102, rather, they are transported to new locations within their existing virtual environment 118.

Once the avatars of the other participants' avatars are transported to their respective new locations in the virtual environment 118, the virtual environment 118 is made transparent by the simulation engine 402. In one example, in the transparent virtual environment 118, the avatars of the other participants can see the team leader participant (or selected participant) in the virtual environment 118 as he appears to the other participants in the capture volume 102. The transparency of the virtual environment 118 reduces as the other participants' avatars get closer to the avatar of the selected participant (e.g., team leader). In said example, the transparent virtual environment 118 assists the participants to get regrouped in a desired formation and their avatars to be placed in locations identical to their counterpart participants in the virtual environment before start of a motion capture exercise without being located inside a wall, under the ground, etc., in the virtual environment. In addition to making the virtual environment transparent, the AI characters may be frozen and avatars of participants cannot interact with them. One of ordinary skill in the art can understand that any other appropriate changes may be made to the virtual environment to assist in regrouping of the participants in the capture volume without departing from the broader scope of this disclosure.

After the participants' avatars are transported to their respective new locations, in operation 1208, the simulation engine 402 may display and start a timer in the virtual environment 118. The timer may be displayed to each of the other participants' avatars and the times may indicate a time interval before which the pause on the motion capture exercise will be removed. In other words, the timer indicates a time interval within which the other participants should regroup in the capture volume 102. In addition to the timer, in operation 1210, the simulation engine 402 also provides directional cues to each participant's avatar to direct them towards the location of the avatar of the selected participant. Once the participants' avatars are relocated to their respective new locations, their respective participants can physically organize themselves in the capture volume 102 to execute the next phase of the exercise.

Once the participants 106 have regrouped in the capture volume 102, in operation 1212 either programmatically or by command, the paused motion capture exercise may be continued to execute the next phase of the motion capture exercise and the process of regrouping ends.

Repositioning in the Real-World

In one example, a participant 106 in a capture volume 102 may be within a threshold distance from a boundary of the capture volume 102 prior to start of a motion capture exercise by the participant's avatar 116 in the virtual world 118. In said example, if the motion capture exercise by the participant's avatar 116 starts when the participant 106 is within a threshold distance from the boundary in the capture volume 102, the participant 106 has to change direction to avoid collision with the boundary. This change in direction in the capture volume may hinder a clean and unrestricted completion of the motion capture exercise.

In another example, a participant 106 in a capture volume 102 may be located at the corner of a cubical room in the physical world prior to initiation of a motion capture exercise of the participant's avatar 116 in the virtual environment 118. Specifically, in said example, the participant's avatar 116 may be a law enforcement officer and may be located in front of a house in the virtual environment 118 that needs to be searched and cleared. When the participant is within a threshold distance from one of the two walls that form the corner of the cubical room in the physical world, the simulation engine 402 may re-direct the participant 106 to turn around and move along an opposite direction, i.e., the participant 106 is redirected by 180 degrees. Accordingly, the participant turns around and immediately reaches the other wall of the two walls that form the corner of the cubical room. If the participant 106 keeps getting redirected by 180 degrees each time, the participant 106 will be stuck within the corner of the room and be re-directed numerous times within a short interval of time, while the participant's avatar is not redirected and continues to move along a previous direction, i.e., into the house in the virtual environment 118. Numerous redirections within a short interval of time, or situations where the participant is stuck in a corner of the capture volume by being redirected may affect the motion capture exercise, especially if the motion capture exercise involves a team activity and the participant that is stuck is the team leader. Methods for resolving the above mentioned shortcomings are addressed in the following paragraphs.

FIG. 13 is a flow chart that illustrates a process of repositioning one or more participants within a capture volume prior to initiation of a group activity in the virtual world, according to certain exemplary embodiments of the present invention.

The process begins at operation 1302 where the simulation engine 402 receives motion capture data of a participant 106 in the capture volume 102 prior to an onset of a motion capture exercise or activity involving the participant's avatar 116 in the virtual environment. In addition, in operation 1302, the simulation engine 402 determines a location and/or movement of direction of the participant in the capture volume 102 based on the received motion capture data.

Upon determining the location and/or direction of movement of participant 106 in the capture volume 102, the simulation engine 402 can check if the location of the participant 106 is within a threshold distance from a boundary of the capture volume 102. If the location of the participant 106 is within a threshold distance from the boundary of the capture volume 102, in operation 1306, the participant 106 may be redirected along another direction in the capture volume 102 to avoid collision with the approaching boundary. Then, in operation 1308, simulation engine 402 determines if the participant 106 will reach another boundary of the capture volume 102 within a threshold interval of time. This determination of operation 1308 can happen concurrently with or after the determination of the direction in which the participant 106 should be redirected upon approaching the first boundary of the capture volume 102.

If the simulation engine 402 determines that the participant 106 will reach another boundary of the capture volume along the redirected path within a threshold interval of time, then, in operation 1310, the simulation engine 402 can pause the motion capture exercise or the simulation of the virtual environment 118. Then, in operation 1312, the participant 106 is directed to move to another location in the capture volume 102 where the participant 106 could have an unrestricted mobility for a period of time greater than the threshold interval of time to perform the motion capture exercise. For example, the simulation engine 402 determines that the initial redirection of the participant leads the participant 106 to another wall in the capture volume 102 within 20 seconds. Accordingly, in said example, the simulation engine 402 may pause the simulation exercise in the virtual environment 118 and the participant 106 is directed to the center of the capture volume 102 where the participant will have mobility unrestricted by the boundaries of the capture volume for more than 20 seconds, which may be 2 minutes, 10 minutes, hours, or so on.

During operation 1312 where the participant is directed to another location in the capture volume 102, the motion capture operation may be active, but the participant's avatar may remain at the same location in the virtual environment till the participant has reached the other location in the capture volume. For example, if the participant's avatar is located in front of a room in the virtual environment, while the participant moves to the new location in the capture volume 102 the participant's avatar will remain in front of the room. Further, it may appear that the participant's avatar is walking in place in front of the room while the corresponding participant walks over to the new location in the capture volume 102.

Once the participant has reached the other location in the capture volume, in operation 1314, the simulation engine 402 synchronizes the location of the participant in the capture volume 102 to the location of the participant's avatar in the virtual environment 118. The process of synchronizing the locations and keeping the avatar at its original location while the participant moves to another location can be achieved by manipulating the transformation matrices that map the participant 106 from the capture volume 102 to the virtual environment 118. Then, in operation 1316, the simulation or motion capture exercise involving the participant's avatar 116 is started and the process ends.

In another embodiment, operation 1308 may be omitted. That is, once the simulation engine 402 determines that the participant is within a threshold distance from a boundary of the capture volume 102 in operation 1304, the simulation engine 402 can move to operation 1310 where the motion capture exercise is paused and the participant is redirected to another location in the capture volume 102. In yet another embodiment, the operation of pausing the motion capture exercise may be initiated by the participant 106. Further, the redirection may be done by the participant and not the simulation engine. For example, when the participant is located in front of a boundary of the capture volume prior to the onset of a motion capture exercise in the virtual environment, the participant 106 may detect the presence of the boundary through the participant's peripheral vision while donning the HMD 112. Then, through gesture, command, or other participant initiated methods, the participant 106 may instruct the simulation engine 402 to pause the motion capture exercise. Then, the participant 106 may walk to another location of the capture volume that is away from the approaching boundary. Once the participant 106 has relocated, then, through gesture, command, or other participant initiated methods, the participant 106 may instruct the simulation engine 402 to synchronize the participant's new location in the capture volume 102 to the location of the participant's avatar 116 in the virtual environment 118 after which the pause on the motion capture exercise is removed.

Although specific operations are disclosed in the flowcharts illustrated in FIGS. 6, 7, 10, 12, and 13, such operations are exemplary. That is, embodiments of the present invention are well suited to performing various other operations or variations of the operations recited in the flowcharts. It is appreciated that the operations in the flowcharts illustrated in FIGS. 6, 7, 10, 12, and 13 may be performed in an order different than presented, and that not all of the operations in the flowcharts may be performed.

All, or a portion of, the embodiments described by the flowcharts illustrated in FIGS. 6, 7, 10, 12, and 13 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described above.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method to avoid collision between a first entity and a second entity disposed in a capture volume comprising:
   computing, by a computer, a modified location of the first entity's avatar based on the location of the first entity and a transformation that is used to map the second entity from the capture volume to the virtual environment;
   rendering, by the computer, a graphical cue corresponding to the first entity at the modified location in a virtual environment displayed to the second entity when the modified location of the first entity's avatar is different from a current location of the first entity's avatar in the virtual environment.

2. The method of claim 1, further comprising: making the graphical cue corresponding to the first entity invisible in the virtual environment displayed to the second entity when the modified location of the first entity's avatar substantially matches the current location of the first entity's avatar.

3. The method of claim 1, wherein the step of computing the modified location of the first entity's avatar comprises:
   determining the location of the first entity in the capture volume; and
   applying the transformation that is used to map the second entity from the capture volume to the virtual environment to the location of the first entity in the capture volume.

4. The method of claim 1, wherein the first entity and the second entity comprise live participants.

5. The method of claim 1, wherein the first entity is a live participant and the second entity is an inanimate object.

6. The method of claim 1, wherein the first entity is an inanimate object and the second entity is a live participant.

7. The method of claim 1, further comprising: changing a degree of opacity of the graphical cue corresponding to the first entity based on a distance between the first entity and the second entity in the capture volume.

8. The method of claim 1, wherein the modified location of the first entity's avatar relative to a location of a second entity's avatar in the virtual environment substantially matches the location of the first entity relative to the location of the second entity in the capture volume.

9. A method to avoid collision between a first entity and a second entity disposed in a capture volume comprising:
   determining, by a computer, that a location of the first entity with respect to a location of the second entity in the capture volume is different from a location of the first entity's avatar with respect to a location of the second entity's avatar in a virtual environment,
   wherein the first entity's avatar is a virtual representation of the first entity in the virtual environment and the second entity's avatar is a virtual representation of the second entity in the virtual environment;
   responsive to a positive determination, displaying a graphical cue corresponding to the first entity at a modified location of the first entity's avatar in the virtual environment that is displayed to the second entity, wherein the modified location of the first entity's avatar is computed based on the location of the first entity and a transformation that is used to map the second entity from the capture volume to the virtual environment.

10. The method of claim 7, wherein the step of determining that a location of the first entity with respect to a location of the second entity in the capture volume is different from a location of the first entity's avatar with respect to a location of the second entity's avatar in a virtual environment comprises:
   determining the location of the first entity in the capture volume;
   applying the transformation that is used to map the second entity from the capture volume to the virtual environment to the location of the first entity in the capture volume for obtaining the modified location of the first entity's avatar; and
   determining that a distance between the modified location of the first 25 entity's avatar and the current location of the first entity's avatar is greater than a threshold distance.

11. The method of claim 8, further comprising:
   making the graphical cue corresponding to the first entity invisible in the virtual environment displayed to the second entity invisible when the distance between the location and the modified location of the first entity's avatar is less than a threshold distance.

12. The method of claim 7, wherein the first entity and the second entity comprise live participants.

13. The method of claim 7, further comprising: changing a visibility of the graphical cue corresponding to the first entity based on a distance between the first entity and the second entity in the capture volume.

14. The method of claim 7, further comprising: increasing the visibility of the graphical cue when the distance between the first entity and the second entity increases in the capture volume, and decreasing the visibility of the graphical cue when the distance between the first entity and second entity decreases in the capture volume.

15. The method of claim 7, wherein a degree of visibility of the graphical cue corresponding to the first entity represents the proximity of the first entity to the second entity in the capture volume.

16. The method of claim 7, wherein a degree of visibility of the graphical cue corresponding to the first entity represents the proximity of the first entity of the second entity in the capture volume.

17. A simulation engine comprising:
a processor; and
a memory comprising a set of instructions that when executed by the processor is configured to:
  determine that a location of a first entity with respect to a location of a second entity in a capture volume is different from a location of a first entity's avatar with respect to a location of a second entity's avatar in a virtual environment,
    wherein the first entity's avatar is a virtual representation of the first entity in the virtual environment and the second entity's avatar is a virtual representation of the second entity in the virtual environment;
  responsive to a positive determination, compute a modified location of the first entity's avatar based on the location of the first entity and a transformation that is used to map the second entity from the capture volume to the virtual environment;
  render and place a graphical cue corresponding to the first entity at the modified location in the virtual environment that is displayed to the second entity.

18. The simulation engine of claim 17, wherein the processor is configured to:
  determine the location of the first entity in the capture volume; and
  applying the transformation that is used to map the second entity from the capture volume to the virtual environment to the location of the first entity in the capture volume.

19. The simulation engine of claim 17:
  wherein the graphical cue is transparent; and
  wherein a degree of transparency of the graphical cue corresponding to the first entity represents the proximity of the first entity to the second entity in the capture volume.

20. The simulation engine of claim 17, wherein the processor is configured to increase a transparency of the graphical cue when the distance between the first entity and the second entity increases in the capture volume, and decreasing the transparency of the graphical cue when the distance between the first entity and second entity decreases in the capture volume.

* * * * *